United States Patent [19]

Gonzales

[11] 4,099,592
[45] Jul. 11, 1978

[54] SPEED LIMITER DEVICES FOR AUTOMOBILES

[75] Inventor: Boris Gonzales, Issy-les-Moulineaux, France

[73] Assignee: Societe Anonyme Automobiles Citroen, Paris, France

[21] Appl. No.: 704,757

[22] Filed: Jul. 12, 1976

[30] Foreign Application Priority Data

Jul. 23, 1975 [FR] France ............... 75 23038
Feb. 18, 1976 [FR] France ............... 76 04452

[51] Int. Cl.² .......................................... B60K 31/00
[52] U.S. Cl. ................................. 180/108; 123/102; 180/105 R
[58] Field of Search .............. 180/105 R, 105 E, 108, 180/109; 123/102, 97, 98; 74/513, 526

[56] References Cited

U.S. PATENT DOCUMENTS

| 3,020,969 | 2/1962 | Von Berg | 180/109 |
| 3,077,239 | 2/1963 | Simas | 180/109 |
| 3,114,427 | 12/1963 | Thorner | 180/109 |
| 3,343,423 | 9/1967 | Thorner | 180/109 X |
| 3,525,415 | 8/1970 | Bata | 180/109 |
| 3,721,309 | 3/1973 | Donaldson | 180/105 R |

FOREIGN PATENT DOCUMENTS

| 719,934 | 10/1975 | Canada | 180/109 |
| 2,033,828 | 12/1970 | France. | |
| 2,215,045 | 8/1974 | France. | |
| 2,258,657 | 8/1975 | France. | |
| 7,500,573 | 3/1974 | Netherlands. | |

Primary Examiner—Joseph Peters, Jr.
Assistant Examiner—Terrance L. Siemens
Attorney, Agent, or Firm—Stevens, Davis, Miller & Mosher

[57] ABSTRACT

A speed limiter device for an automobile vehicle having a combustion engine comprising an air intake manifold provided with a throttle member manual control of the accelerator pedal type which acts on the opening of the throttle member and a connecting member between these opening devices and the throttle member. The limiter device comprises apparatus sensitive to a speed parameter of the vehicle for producing a speed signal, a comparator to compare this signal with a predetermined limit, and an amplifier for the signal supplied by the comparator. The amplifier controls a drive which is sensitive to the suction in the intake manifold and acts on the throttle member so as to keep the value of the speed parameter at the predetermined limit when the limiter device is engaged. The connecting member between the opening control and the throttle member has a substantially constant length when the limiter device is not engaged and a variable length when the limiter device is engaged.

38 Claims, 28 Drawing Figures

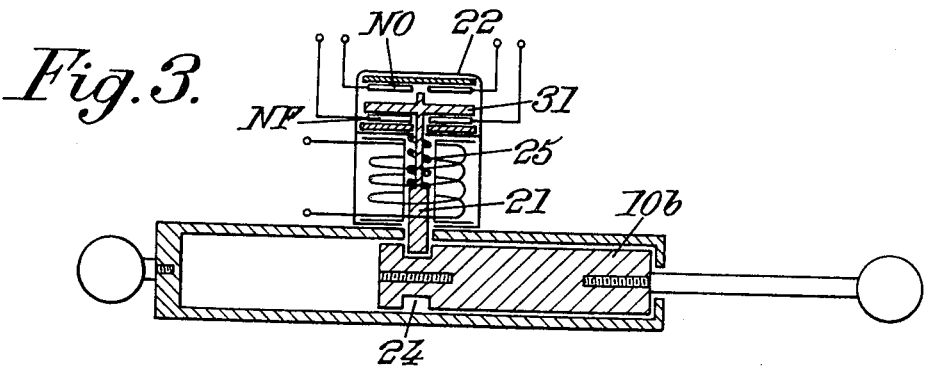
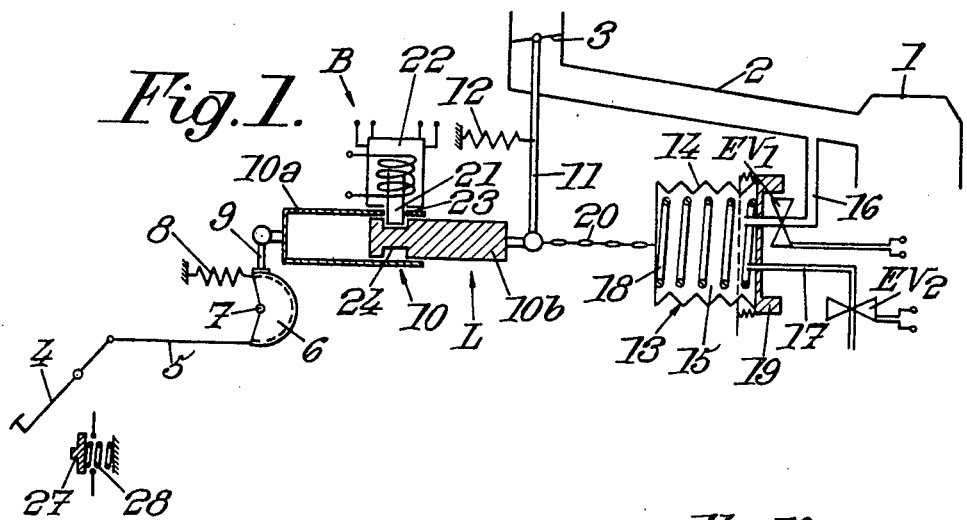
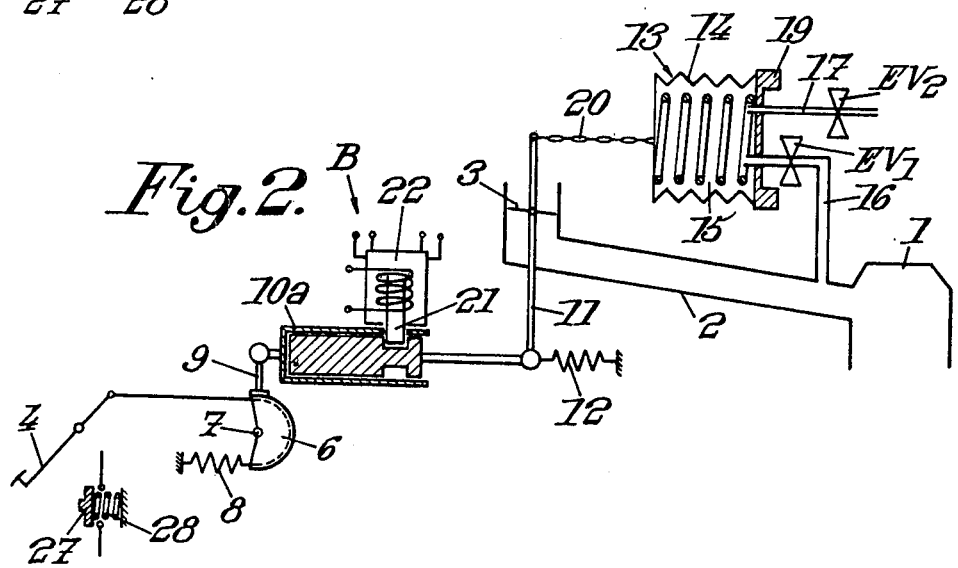

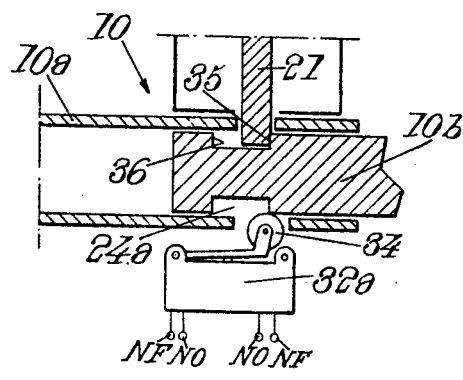
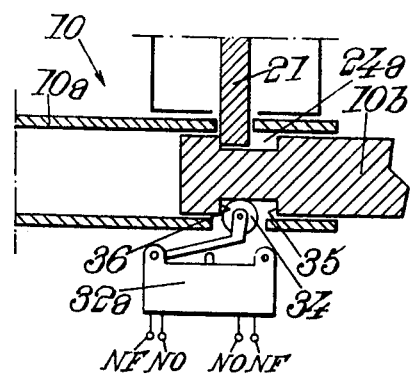
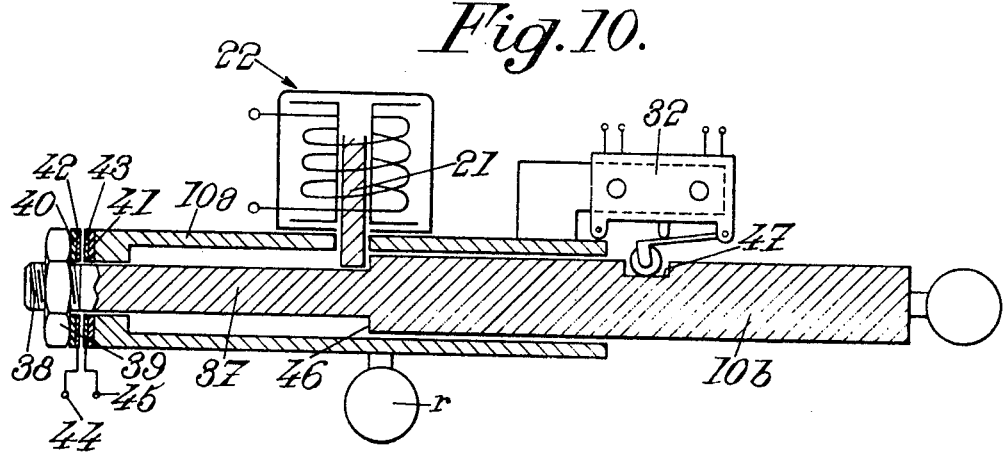

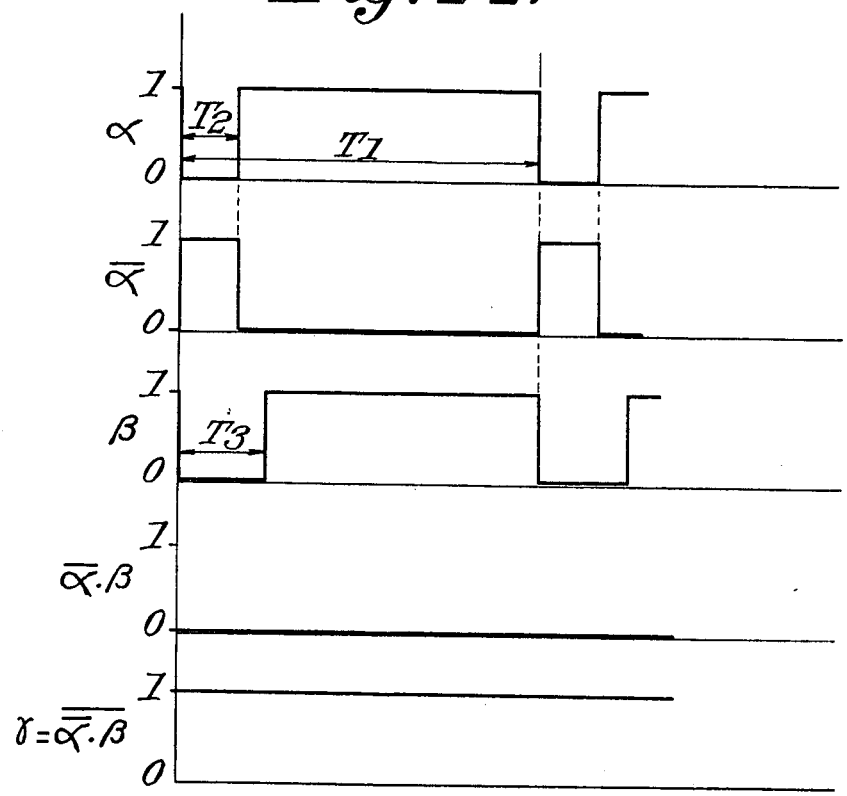
Fig. 22.
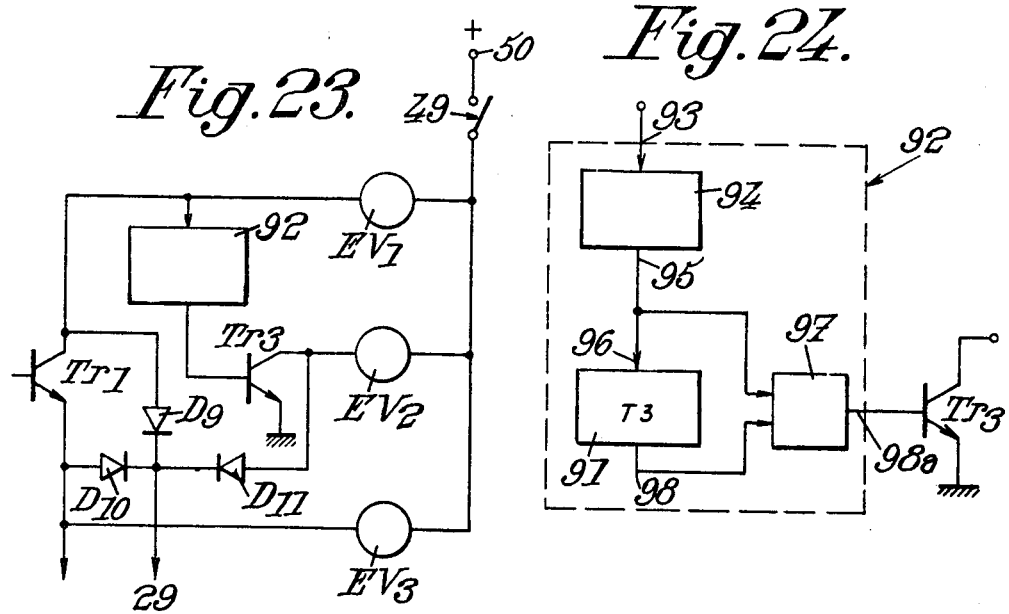

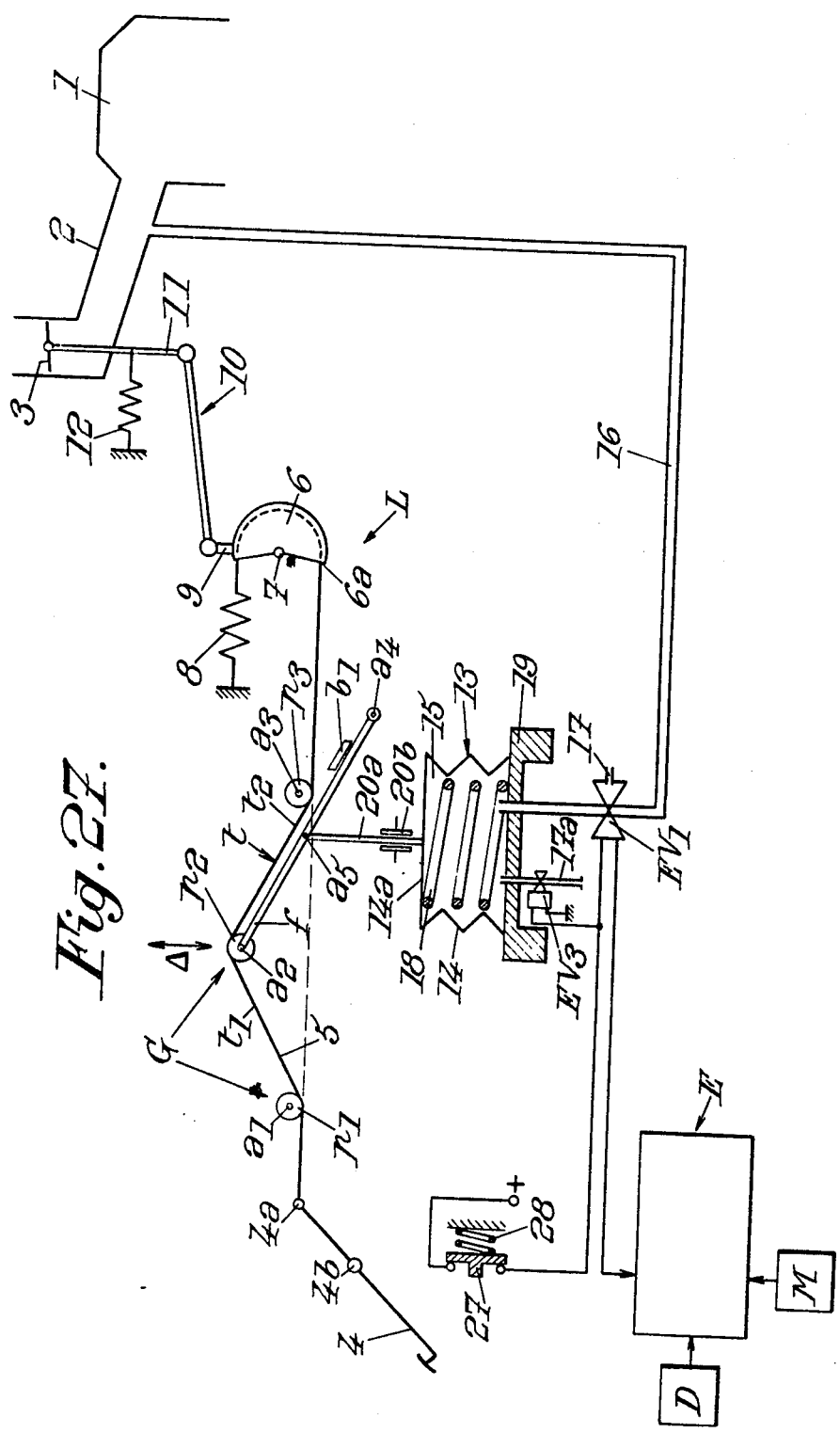

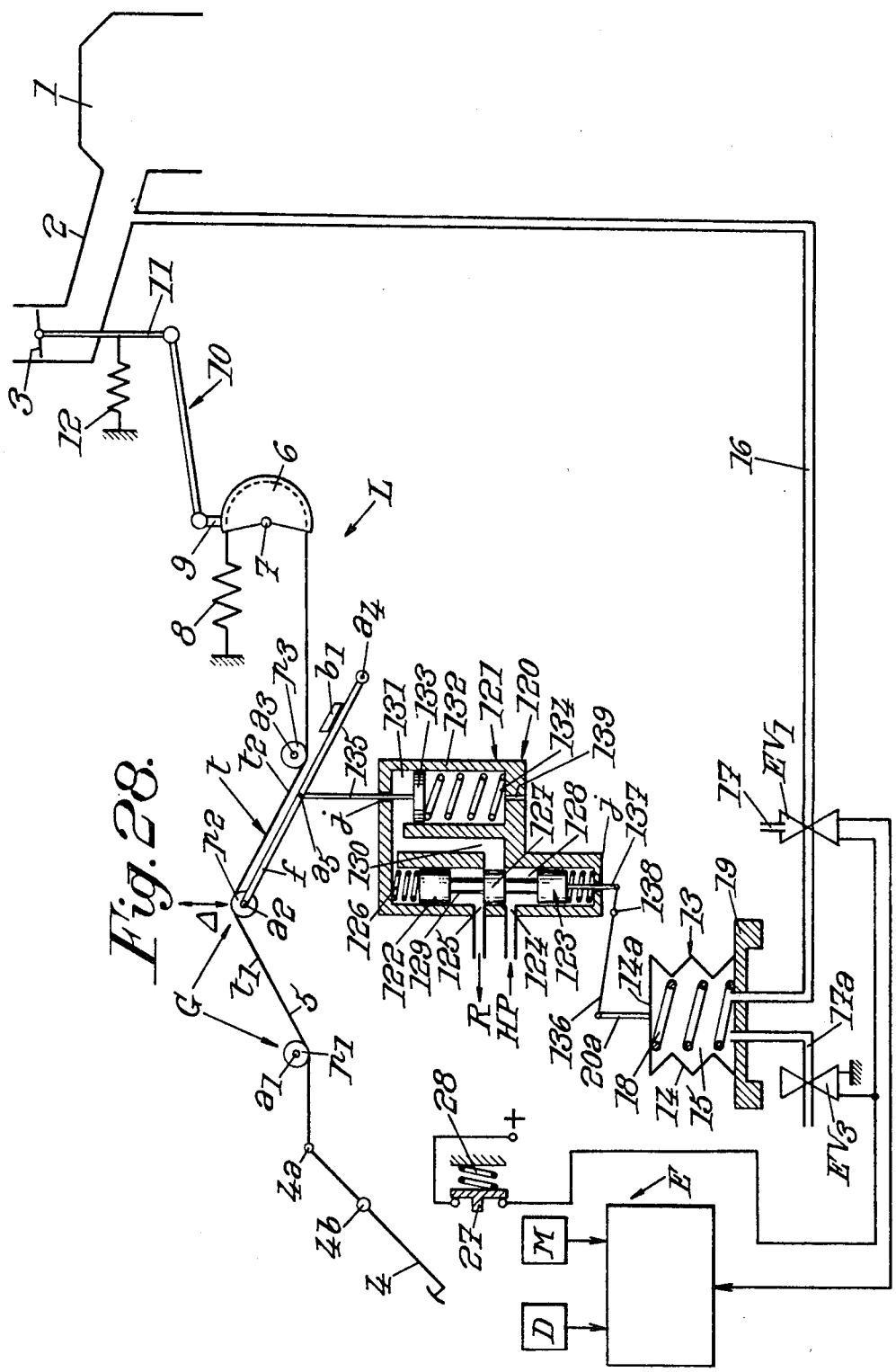

SPEED LIMITER DEVICES FOR AUTOMOBILES

BACKGROUND OF THE INVENTION

1. Field of the Invention

The present invention relates to speed limiter devices for automobile vehicles having a combustion engine comprising an air intake manifold provided with a throttle member, manual control means, of the accelerator pedal type, to modify the opening of the throttle member and linking means between these opening control means and the throttle member.

2. Description of the Prior Art

Such limiter devices are of the type which comprise: means sensitive to a speed parameter of the vehicle, which sensing means are adapted to produce a speed signal, comparator means provided for comparing this signal with a predetermined limit, and amplifier means for the signal supplied by the comparator means, these amplifier means being adapted to control the putting into action of drive means sensitive to the suction in the intake manifold, these drive means acting on the opening of the throttle member so as to maintain the value of the speed parameter of the vehicle at the predetermied limit when the limiter device is engaged.

OBJECTS AND GENERAL DESCRIPTION OF THE INVENTION

It is an object of the invention to render these limiter devices such that they respond to the various exigences of practice better than hitherto.

It is another object to provide such a limiter device which is simple and effective in use without affecting the driving habits of motorists.

Other objects and advantages of the invention will become apparent from the following description.

According to the invention, there is provided a speed limiter of the type concerned, characterized by the fact that the abovesaid linking means between the opening control means and the throttle member are arranged so as to have a substantially constant length when the limiter device is not engaged and to have a variable length when the limiter device is engaged, that this limiter device comprises a device forming a resistant point for the stroke end of the manual control means, this resistance point forming device being adapted to be overcome by the manual control means on the exertion, on the control means, of a sufficient force, electrical contact means being also provided to be actuated by the manual control means when the aforesaid resistant point is overcome, these electrical contact means being adapted to control the maximum opening of the throttle member, the assembly being such that when the limiter device is engaged, the vehicle driver holds the manual control at the stroke end, in abutment against the resistant point forming device, and that in the course of limitation, the overcoming of this resistant point enables the limitation to be overcome and the maximum opening of the throttle member and the maximum power of the engine to be attained.

In a first embodiment, the linking means may comprise a telescopic rod formed by a cylinder and a piston adapted to slide in the cylinder, said piston being arrestable in a axial position, with respect to the cylinder, by a bolt adapted to be withdrawn by unlocking means, electrical contact means adapted to change its state according as the piston and the cylinder are locked or unlocked being provided, one at least of these electrical contact means being connected so as to control the disengagement of the limiter device at the moment when the locking of the cylinder and of the piston occurs when the manual control is released (lifting of foot) when the limiter was engaged.

The bolt and the telescopic rod may be constituted by the core, or a part fast to the core, of an electromagnet mounted on the cylinder of the telescopic rod, this electromagnet constituting unlocking means for the telescopic rod.

The electrical contact means adapted to change state according as the rod is locked or not are constituted, advantageously, by at least one end of travel contact of the core of the electromagnet, notably an end of travel contact normally closed when the cylinder and the position are locked, the electrical connection of this normally closed contact being provided so that a signal actuating the disengagement of the limiter device is produced on the unlocking of the telescopic rod, when the limiter device is engaged.

It is possible to provide a stroke end contact normally open when the rod is locked, this normally open contact being closed when the rod is unlocked, the electrical connection of this normally open contact being such that the engagement of the limiter device cannot take place as long as this normally open contact is not closed.

The electrical contact means adapted to change state according as the telescopic rod is locked or not may, according to a modification, be constituted by a microswitch mounted on the cylinder, which microswitch comprises an arm adapted to operate with a groove provided in the piston, the position of this groove being such that the arm changes position and that the microswitch changes state according as the rod is, or is not, locked.

This microswitch comprises a contact (active or resting) adapted to control the disengagement of the limiter device when the locking of the rod occurs when the limiter is engaged.

The throttle member drive means, sensitive to the suction in the intake manifold, are constituted by a pneumatic jack having a chamber connected to the engine intake manifold, downstream of the throttle member, the admission of suction in this chamber being controlled by the control means such as an electrovalve. The jack comprises a fixed base and a bottom movable according to the suction, this movable bottom being connected by flexible means, such as a chain, to a lever controlling the opening of the throttle member, the admission of suction into the jack causing contraction of the latter and opening of the throttle member, the aforementioned jack comprising also a passage enabling a slow leak to be established between the chamber of the jack and the atmosphere, this passage being equipped with a second electrovalve adapted to control the opening or the closing of this slow leak, the abovesaid electrical contact means actuated by the manual control means on clearing the resistant point at the stroke end, being adapted to control the admission of suction into the chamber of the jack through the first electrovalve, and the closing of the slow leak by the second electrovalve, which results in the complete opening of the throttle member.

The electrical contact means actuated on the overcoming by the manual control means of the resistant point, at the stroke end, comprise two electrical contacts adapted to the closed successively, the first electrical contact closed by the manual control means ensuring the bringing into action of the telescopic rod unlocking means, notably the energising of the electromagnet, whilst the second electrical contact closed after the first, actuates the admission of suction into the jack and the closing of the slow leak to the atmosphere of the pneumatic jack.

Preferably, the limiter device comprises means sensitive to the torque demanded from the vehicle engine and means for comparing this torque with a predetermined value, the assembly being such that when the torque demanded reached or exceeds the predetermined value, the closing of the slow leak, to the atmosphere, of the pneumatic jack is actuated.

Advantageously, the means sensitive to the torque demanded from the engine are constituted by the duration of the signal controlling the opening of the electrovalve admitting suction into the chamber of the jack, the predetermined value of the torque of the engine being constituted by a predetermined duration of the signal controlling the opening of the electrovalve, the predetermined duration being obtained by a monostable circuit.

Preferably also, the limiter device comprises electrical contact means sensitive to the direction of the force transmitted by the rod between the manual control means (accelerator pedal) and the throttle member, an acceleration or a deceleration of the engine being obtained according to the above-mentioned direction of the force.

The electrical contact means sensitive to the direction of the force transmitted by the rod are connected so as to control the admission of suction into the pneumatic jack when the direction of the force corresponds to an acceleration actuated by the manual control means, the admission of suction into the jack being cut off when the direction of the force is opposite and corresponds, notably, to the actuation of deceleration by the manual control, the slow leak of the jack to the atmosphere being then open, the assembly being such that when the limiter device is not engaged, the jack occupies the position corresponding to the opening of the throttle member so that the chain connecting the bottom of the jack, to the throttle member lever, remains tight.

The jack is advantageously equipped with a rapid leak for connecting its chamber to the atmosphere, this rapid leak being controlled by a third electrovalve actuated by the above-said means sensitive to the direction of the force transmitted by the rod, this third electrovalve being notably connected so as to be closed when it becomes tight.

According to another embodiment, the drive means sensitive to the suction in the intake manifold being formed by a pneumatic jack, the limiter device is characterised by the fact that this pneumatic jack is inserted in the linking means between the control means and the throttle member, the assembly of this pneumatic jack being movable, the above-said pneumatic jack comprising return means, notably formed by a spring, whose stiffness is such that the jack can transmit, to the throttle member, up to the fully open position, the force exerted by the manual control means, whilst keeping a length equal to its maximum length and this when the limiter device is not engaged and the suction is not admitted into the jack, the above-said jack comprising a permanent slow leak for the connection of its inner chamber to the atmosphere, the assembly being such that when the limiter device is engaged, for the "foot to the floor" or "all out" position of the manual control, the throttle member is at maximum open position when the jack is connected to the atmosphere whilst this throttle member is fully closed when the suction is admitted into the jack, so that the driver can drive "all out" when the limitation is engaged.

The jack comprises a base connected to a lever fast in rotation to a sector element adapted to be moved by the manual control means, whilst the bottom of the jack is connected to another lever which, through a rod, acts on the position of the throttle member.

A single electrovalve is provided for the control of the opening or of the closing of a passage connecting the chamber of the jack to a suction zone of the intake manifold.

According to another embodiment, the linking means between the control means and the throttle member comprise a flexible link and guide means for this link adapted to define a broken line path for the flexible link, one at least of the guide means being adapted to be moved by the drive means sensitive to the suction so that the length of the broken line path is variable when the limiter device is engaged, the above-said length of the broken line path remaining constant when the device is not engaged.

Preferably, guide means for the flexible link define a path in the form of an obtuse angle whose two sides are formed by tie segments, the guide means adapted to be moved by the drive means being situated at the apex of this angle.

Generally, the guide means are constituted by guide pulleys rotatable around their axles; preferably three pulleys are provided and are separated from one another, the two end pulleys being mounted on fixed axles whilst the intermediate pulley situated at the apex of the obtuse angle is mounted on an axle adapted to be moved by the drive means.

These suction sensitive drive means are generally constituted by a pneumatic jack whose base is fixed and of which the bottom of the wall is movable according to the suction in the manifold. This bottom is notably connected directly or indirectly to the guide means of the flexible tie adapted to be moved by the suction sensitive drive means.

The movable axle of the pulley located at the apex of the obtuse angle is preferably mounted at the end of a lever pivoted to a fixed point, of which lever the angular position is controlled by the pneumatic jack.

The control of the angular position of the lever may be ensured directly from the pneumatic jack by a rod connected to the bottom of the pneumatic jack and pivoted to a point of the lever, preferably between the movable pulley and the fixed pivoting point of the lever.

Advantageously, it is possible to provide a force multiplier, notably hydraulic, between the pneumatic jack and the element which must be controlled by the jack, so that the pneumatic jack acts on the input of this amplifier whilst said element, notably the lever carrying the movable pulley is controlled by the output from this amplifier.

The hydraulic force amplifier comprises preferably a slide valve whose movements are controlled by the pneumatic jack, notably through a lever, and a hydraulic jack whose supply with fluid under pressure or connection to exhaust is controlled by the slide valve, this hydraulic jack controlling the angular position of the lever carrying the movable pulley.

Whatever the embodiment employed, the limiter devices comprise advantageously means sensitive to the swinging of the signal supplied by the comparator means, when the speed parameter of the vehicle reaches and exceeds the predetermined limit, these swing sensitive means being adapted to control the automatic engagement of the speed limiter.

BRIEF DESCRIPTION OF THE DRAWINGS

The invention consists, apart from the features disclosed above, of certain other features which will be considered more explicitly below with regard to embodiments described with reference to the accompanying drawings, but which are in no way limiting.

In the drawings:

FIG. 1 is shows diagrammatically, in section, the parts of one embodiment of a speed limiter device according to the invention.

FIG. 2 shows, similarly to FIG. 1, a modification of a speed limiter device according to the invention.

FIG. 3 shows in section, on a large scale, a telescopic rod and unlocking means.

FIGS. 8 and 9 show, in two different positions, a telescopic rod of the type shown in FIG. 7 and comprising a groove, for locking, whose axial dimension is greater than that of the bolt.

FIG. 10 is another modification of the telescopic rod.

FIG. 22 shows the various signals obtained when the conditions are such that the electrovalve controlling the slow leak remains open, notably in the case where the vehicle is running down hill.

FIG. 23 shows, diagrammatically, the part of a circuit enabling control of the sow leak electrovalve according to the signals shown in FIGS. 21 and 22.

FIG. 24, shows in more detail a part of the circuit of FIG. 23.

FIG. 27 shows diagrammatically another embodiment of a limiter device according to the invention.

Lastly, FIG. 28 shows an embodiment of a limiter device equipped with a force amplifier for the pneumatic jack, according to the invention.

DESCRIPTION OF PREFERRED EMBODIMENTS

Figure 4:
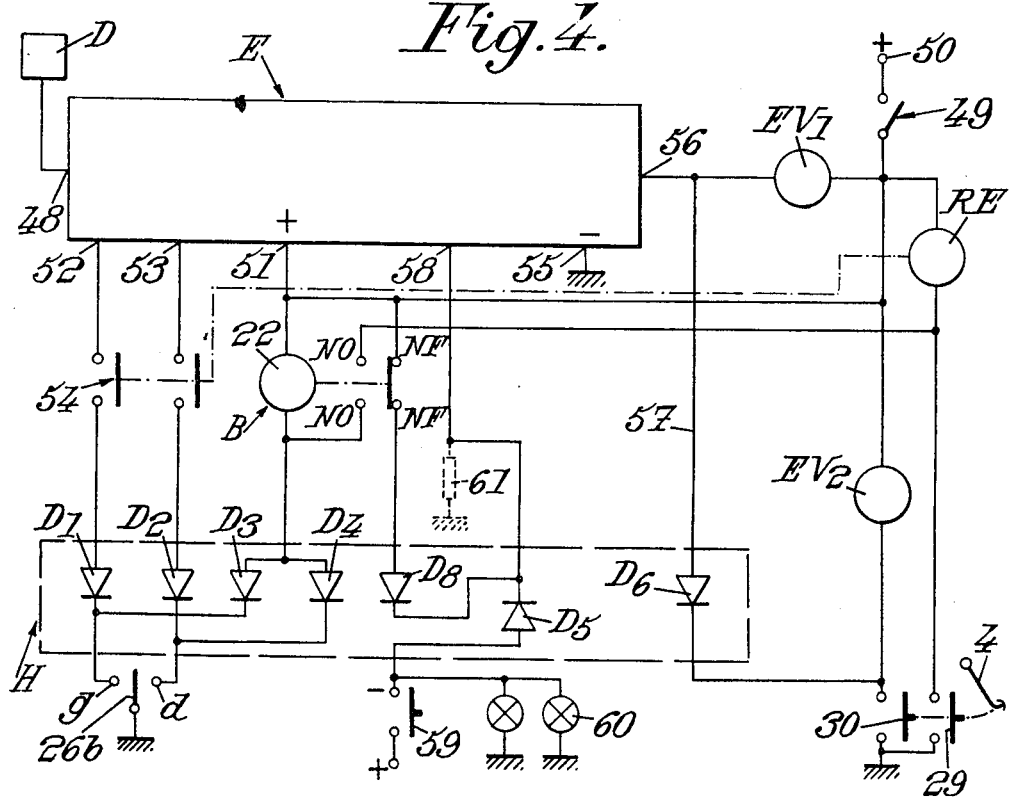
FIG. 4 is a diagram of the electrical connections in a first embodiment of a limiter device according to the invention.

Referring to FIG. 1, it is possible to see certain parts of a speed limiter device for an automobile vehicle having a combustion engine shown diagrammatically at 1, comprising an air intake manifold 2 provided with a throttle member 3 or throttle valve.

Control means, notably formed by an accelerator pedal 4, are provided to act on the opening of the throttle member 3. Linking means L are provided between the accelerator pedal 4 and this member 3.

The means L comprise, notably, a cable 5 attached to one end of the pedal 4. At its other end, the cable 5 is wound on a circular sector 6 and is connected to a return spring 8. A rod 9 is borne by the sector 6. This rod 9 is connected, through a pivot, to a telescopic rod 10. The other end of the telescopic rod is pivoted on the end of a lever 11 fixed in rotation to the axle of the throttle member 3 and controlling the angular position of this member. Elastic return means formed by a spring 12 are provided to urge the lever 11 into the position corresponding to the closing of the throttle member 3.

The limiter device comprises means sensitive to a speed parameter of the vehicle, this parameter being constitutable, either by the speed or (rotary speed) of the engine, or by the speed of the vehicle. These sensitive means have been shown diagrammatically in FIG. 4 where they are denoted by D and may be constituted by any suitable sensor, notably a magnetic or electromagnetic detector.

These sensing means D are adapted to produce a speed signal sent into an electronic assembly E (FIG. 4) designed to analyse the signal.

Figure 5:
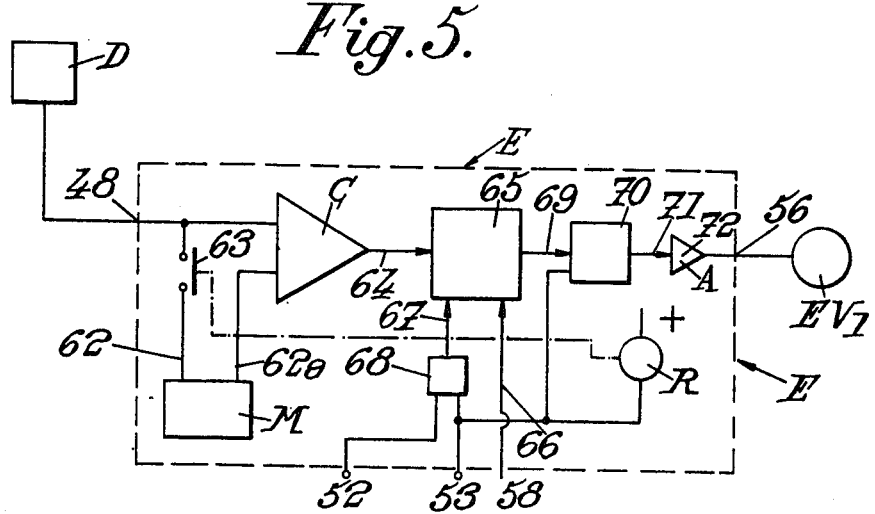
FIG. 5 is a more detailed diagram of a part of FIG. 4.

This electronic assembly E comprises comparator means C shown in FIG. 5.

These comparator means are provided to compare the signals coming from the sensing means D with a predetermined limit supplied notably by a memory M (FIG. 5).

Amplifying means A (FIG. 5) are in addition provided to amplify the output signal supplied by the comparator means C.

These amplifier means A are adapted to control the bringing into action of drive means 13 (FIGS 1 and 2), sensitive to the suction in the intake manifold 2 and acting on the opening of the throttle member 3 so as to keep the value of the speed parameter of the engine at the predetermined limit when the limitor device is in operation.

These drive means are advantageously constituted by a pneumatic jack 13 with a deformable bellows 14 defining an inner chamber 15 connected to a passage 16 to the intake manifold 2, downstream of the throttle member 3, as is seen in the drawings. The opening or the closing of the passage 16 is controlled by an electro-valve EV1, the energising of which is controlled by the amplifier A of the electronic assembly E (FIG. 4).

A passage 17 to create a slow leak connecting the chamber 15 of the jack to the atmosphere is provided. An electrovalve EV2 is mounted on this passage 17 to control its opening or closing. This electrovalve EV2 is energised by the electronic assembly E.

The pneumatic jack 13 comprises, in the chamber 15, a return spring 18, working in compression and tending to separate the bottom of the bellows 14 from the base 19 of the jack. This base 19 is rigidly mounted on a fixed part of the vehicle.

The bottom of the bellows 14 is connected by a small chain 20 to one end of the lever 11. The assembly is arranged so that when suction is admitted into the chamber 15, the bellows 14, in retracting, pulls the chain 20 and actuates an increase in the opening of the throttle member 3.

In FIG. 1, is shown a device in which the opening of the throttle member 3, actuated by the accelerator pedal 4, is obtained by a thrusting force of the rod 10 on a lever 11. In this case, the chain 20 is hooked to the end of the lever 11 on which one end of the rod 10 is pivoted.

FIG. 2 shows an embodiment in which the control of the lever 11 from the accelerator pedal 4 is effected by pulling it. The chain 20 is then hooked to one end of the lever 11 situated, with respect to the axis of rotation of the member 3, on the other side of the rod 10. In all cases, the spring 12 is arranged so as to bring back the member 3 into closed position.

The limiter device comprises unlocking means B combined with linking means L and adapted to uncouple the throttle member 3 and control means 4; the limiter device also comprises means for bringing into action such as 26b (FIG. 4) the unlocking means B, adapted to cause the unlocking means to act on engagement of the limiter device, the the assembly being such that the linking means L become variable length means and that the variations in the opening of this throttle member 3 actuated by the drive means or jacks 14 sensitive to the suction are without influence on the above-mentioned control means.

The rod 10 is a telescopic rod comprising two parts 10a, 10b, slidable with respect to one another whilst being arrestable, relatively, by a transverse bolt 21. This bolt 21 can be withdrawn by unlocking means B to free the two parts 10a, 10b.

Advantageously, the part 10a is constituted by a cylinder, whilst the part 10b is constituted by a piston slidable in the cylinder. The bottom of the cylinder 10a is pivoted on the foot 9, whilst the opposite end of the piston 10b is pivoted to one end of the lever 11.

The transverse bolt 21 is advantageously constituted by the core of an electro-magnet 22 or by a part made fast to this core. This electro-magnet 22 constitutes the unlocking means B.

The bolt 21 oriented perpendicularly to the longitudinal axis of the rod 10 passes through an opening 23 provided in the peripheral wall of the cylinder 10a and is adapted to cooperate with a groove 24 of the piston.

As seen more clearly in FIG. 3, the electromagnet 22 is arranged so that when it is not energised, the bolt 21 urged by return means is held in the groove 24 or has a tendency to return into this groove. The return means of the bolt 21 may comprise the effect of gravity completed by the effect of a return spring 25, (FIG. 3).

The energisation of the electro-magnet 22 causes the disengagement of the bolt 21 from the groove 24 and releases the piston 10b with respect to the cylinder 10a.

The energising of the electro-magnet 22 is actuated under different circumstances, as will be seen below, but notably on the engagement of the limiter device. This engagement may be obtained manually by operating a single throw switch such as 26a (FIG. 14) or a double throw switch such as 26b (FIG. 4) corresponding on the one hand to the engagement proper of the limiter device with memorisation of the speed reached at the moment when the engagement occurs (position d) and, on the other hand, to the re-engagement of the limiter device (position g). Further explanations will be given on this subject. These switches resume their resting position when one ceases to act on them so that the electro-magnet 22 is not kept under voltage.

However, the parts 10a, 10b can remain unlocked since at the moment of the withdrawal of the bolt 21, the lever 11, under the effect of the spring 12, moves the piston 10b in opposite direction to the cylinder 10a by the pedal 4 on which the driver of the vehicle is pressing.

Thus, on the energisation of the electromagnet 22, in the case of the assembly of FIG. 1, the telescopic rod will shorten so that the groove 24 is no longer line with the bolt 21. When the electro-magnet is no longer energised, the bolt will rest on the peripheral wall of the piston 10b without causing locking. In the case of FIG. 2, the telescopic rod will extend.

A device 27 forming a resistant point for the end of travel of the accelerator pedal 4 is provided so that when the limiter is engaged and the parts 10a, 10b of the telescopic rod have been freed with respect to one another, the pedal 4, under the action of the driver, comes into abutment against this device 27 comprising a compression spring 28 which is relatively difficult to compress.

Thus, when the limiter device operates, the jack 14 actuates the variations in the opening of the throttle member 3 and no force is transmitted by the piston 10b to the cylinder 10a. The driver will hence be able to keep his foot on the accelerator pedal 4 in abutment against the device 27.

This device 27 forms a "kick-down". If the driver exerts the relatively strong thrust on the pedal 4, the spring 28 can be compressed and the additional travel of the pedal 4 is used to actuate at least one electrical contact, notably to close successively two contacts 29, 30, (FIG. 4).

The contact 29, which is the first closed, actuates the energising of the electro-magnet 22 so that the bolt 21 is maintained in withdrawn position. The second contact 30 actuates the full admission (opening of EV1) of suction into the chamber 15 of the pneumatic jack 13 and the closing of the communication with the atmosphere (closing of EV2) so that this jack 13 can actuate the full opening of the throttle member 3, which enables the full power of the engine to be obtained.

It will be understood that under these conditions, the piston 10b of the rod in the same way as the cylinder 10a occupy the relative positions which they would have if the full opening of the throttle member 3 were actuated by the accelerator pedal 4; the bolt 21 is thus in line with the groove 24. It is then necessary to hold it in withdrawn position by supplying the electro-magnet 22 to prevent a fortuitous re-locking by entry of the bolt 21 into the groove 24, which justifies the presence of the contact 29.

Electrical contact means are provided to detect the relative positions of the parts 10a, 10b of the rod 10, these contact means being notably adapted to change in state according as the rod is bolted or unbolted.

In a first embodiment shown in FIG. 3, two electrical contacts are provided denoted respectively by NF and NO and adapted to be closed by a strip 31 fast to the core 21 of the electro-magnet.

The contact NF is closed when the bolt 21 is engaged in the groove 24 and the rod is locked. The electro-magnet 22 is not energised. In the opposite case, the contact NF is open.

The contact NO is closed when the electro-magnet 22 is energised and the core is 21 is disengaged from the groove 24. This contact NO is closed even if the electro-magnet 22 is no longer energised, provided that the core 21 remains supported against the periphery of the piston 10b, outside of the groove 24.

As seen in FIG. 4, and as explained later, the contact NF is connected, in the general electrical circuit of the limiter device, so that the closing of this contact, which occurs when there is locking of the rod and entry of the bolt 21 into the groove 24, actuated the disengagement of the limiter device.

The contact NO closed when the bolt 21 is outside of the groove 24, is used, as seen in FIG. 4, to permit re-energisation of the electro-magnet 22 when the accelerator pedal 4, on "kick-down", overcomes the resistant point to close the electrical contact 29.

Figure 7:
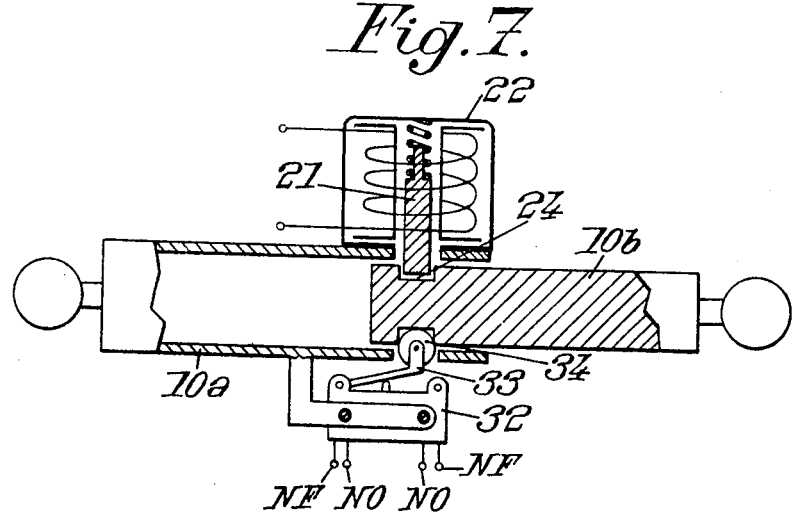
FIG. 7 shows in detail a telescopic rod combined with a microswitch.

In a modification, shown in FIG. 7, the strok end travel contacts of the electro-magnet shown in FIG. 3, are replaced by the contact of a microswitch 32 fixed to the cylinder 10a. This microswitch comprises an actuating arm 33 provided with a roller 34 passing through an opening formed in the wall of the cylinder 10a and adapted to cooperate with the piston 10b.

The whole is arranged so that when the piston 10b is bolted in the cylinder 10a (bolt 21, groove 24), the roller 34 is engaged in this groove 24 and a contact similar to the contact NF of FIG. 3 is closed between the terminals of the microswitch 32 denoted by NF. This contact is open for any other relative position of 10b and of 10a.

FIGS. 8 and 9 show a modification of the embodiment in which the groove 24a provided in the piston 10b has an axial dimension much greater than the axial dimension of the bolt 21. For example, the groove 24a has an axial dimension substantially double that of the bolt 21. The whole is arranged so that when the bolt 21 is engaged in the groove 24a, the microswitch 32a can change state according as the bolt 21 is in abutment against one leading edge 35 (FIG. 8) of the groove 24a or against the other leading edge 36 (FIG. 9) of this same groove.

The position shown in FIG. 8 corresponds to a thrust from left to right exerted by the cylinder 10a on the piston 10b, and hence to an increase in the opening of throttle member 3, actuated by the accelerator pedal 4 (acceleration). The microswitch 32a is in working position, the roller 34 being supported against the periphery of the piston 10b and occuring outside the groove 24a. The contact NF is then open.

FIG. 9 corresponds, either to a tractive force from right to left, exerted by the cylinder 10a on the piston 10b (deceleration), which tractive force occurs when the foot is lifted from the accelerator pedal 4 to produce closing of the throttle valve, or to a tractive force exerted from left to right in FIG. 9 by the piston 10b on the cylinder 10a, which tractive force is due to too strong an action of the pneumatic jack 13, as explained below. The roller 34 is positioned entirely within the groove 24a and the microswitch 32a is in resting position (contact NF closed).

The assembly of FIGS. 8 and 9 is used in combination with a supplementary electro-valve EV3 provided to actuate a rapid leak for connecting the jack 13 to the atmosphere. More detailed explanations will be given on this subject in the description of FIG. 18.

The contact means provided in FIGS. 8 and 9 are hence, in a way, sensitive to the direction of the force (acceleration or deceleration) transmitted by the rod 10 between the accelerator pedal and the throttle member.

A modification of such contact means sensitive to the direction of the force transmitted by the rod is shown in FIG. 10.

The piston 10b of the rod is extended by a portion 37, of smaller diameter which passes through the bottom of the cylinder 10a and projects outside of the cylinder, by a threaded end 38. A nut 39 is screwed on this end in order to serve as a stop for the cylinder 10a.

Electrically insulating plates, for example washers of plastics material, are arranged against the face of the nut 39 turned towards the cylinder 10a and against the outer surface of the bottom of the cylinder 10a.

Between these insulating plates 40, 41 are placed two conducting plates 42, 43, adapted to establish an electrical contact when they become urged against one another. These conducting plates 42, 43 are connected by leads to terminals 44, 45.

The contact between the plates 42, 43 is closed when the cylinder 10a drives the piston 10b to the left of FIG. 10 (closing of the throttle member 3 accompanied by deceleration) or when the piston 10b has a tendancy to pull on the cylinder 10a towards the right of FIG. 10 (the jack 13 then acts in reverse direction to the cylinder 10a). In the embodiment of FIG. 10, the bolt 21, when it is in bolting position, is adapted to cooperate with the shoulder 46 formed where the portion 37 adjoins the piston 10b.

A microswitch 32 fixed on the cylinder 10a, and similar to that of FIG. 7, cooperates with a recess of the piston 10b. The change in state of the microswitch 32 of FIG. 10 occurs under the same conditions as the changes in state of the microswitch 32 of FIG. 6.

It is to be noted that in the case of FIG. 10, the pivot or ball joint r, provided on the cylinder 10a is situated on the peripheral wall of the cylinder.

Referring to FIG. 4, it is possible to see the diagram of the electrical connections in the limiter device according to a first embodiment of the invention.

The electronic assembly E, shown diagramatically by a rectangle, and described in detail below with reference to FIG. 5, comprises an input terminal 48 connected to means sensitive to the speed D. The supply of electrical current is effected from a positive terminal 50 through a general switch 49. This switch is connected to a terminal 51 of the assembly E.

A terminal 52 is arranged to address signals to a storage. This terminal is connected, through a working contact 54 of the relay RE and a diode D1 to the terminal g of a switch 26b. The anode of the diode D1 is connected to a terminal of the switch 54, whilst the cathode of this diode is connected to the terminal g. The movable strip 26b is connected to ground.

Another terminal 53 is provided in the assembly E to permit the input of the signals actuating engagement of the limiter device and the manual advance. This terminal 53 is connected to the terminal D of the switch 26b through another working contact 54 of the relay RE and a diode D2 whose cathode is connected to the terminal D.

A terminal 55 of the assembly E is connected to ground.

Another terminal 56 constitutes the output of the assembly E and is connected to one end of the winding of the electrovalve EV1. The other end of the winding of this electrovalve is connected to a terminal of the switch 49.

The output 56 is also connected through a lead 57, as seen in FIG. 4, to the anode of a diode D6 whose cathode is connected to a terminal of the "kick-down" contact 30. The other terminal of this contact 30 is connected to ground. The winding of the electromagnet EV2 is connected between the switch 49 and the terminal of the contact 30 connected to the cathode of D6. The relay RE has its winding connected between the switch 49 and a terminal of the "kick-down" contact 29. The other terminal of this contact 29 is connected to ground.

The winding of the electromagnet 22 is connected between one terminal switch 49 and a common connection between the anodes of the two diodes D3, D4. The cathodes of these diodes are connected respectively in parallel to cathodes of the diodes D1, D2. The diodes D1, D3 on the one hand, and D2, D4 on the other hand, form two "AND" circuits; the diodes D3, D4 form an "OR" circuit since the electromagnet 22 will be energised when the switch 26b is closed at terminal d or at terminal g.

NF electromagnet 22, designed to be used in the diagram of FIG. 4, is of the type shown in FIG. 3 with two stroke end contacts NE and NO.

One terminal of the contact NF, as seen in FIG. 4, is connected through the switch 49, to the positive supply. The other terminal of this contact NF is connected to the anode of a diode D8. The cathode of this diode D8 is connected to a terminal 58 of the assembly E. This terminal 58 is for the input of the locking and disengagement signals of the limiter device.

One terminal of the contact NO of the electromagnet 22 is connected to the end of the winding of the relay RE connected to a terminal of the contact 29. The other terminal of the contact NO is connected to the common connection of the anode of diodes D3, D4.

The "stop" contactor 59 adapted to be closed, when the driver presses the brake pedal, has one terminal connected to the positive supply shown diagrammatically by the sign "+"; the other terminal of this contactor 59 is connected to the anode of a diode D5. The cathode of this diode D5 is connected to the cathode of the anode D8. The light bulbs 60 connected between the terminal of the contact 59, connected to the diode D5, and ground, represent diagrammatically, the stop signals which light up on braking.

A resistor 61, connected between the terminal 58 and ground, enables the reclosing, if necessary, of the path disengagement-locking to ground, through a small resistance, instead of the lamps 60.

The diode assembly may be placed in a diode box H; the resistor 61 may be inserted in this box H.

Referring to FIG. 5, a more detailed diagram of the assembly E can be seen.

The terminal 48 is connected to one input of a comparator C. This terminal 48 is also connected to an input 62 of a storage M, through a working contact 63 of a relay R. The output 62a from the storage M is connected to another input of the comparator C.

The output 64 from the comparator is connected to the input of a gate 65.

The closing of this gate 65 can be actuated by sending signals to a terminal 66 of the gate. This terminal 66 is connected to the terminal 58 previously described.

The opening of the gate 65 can be actuated by sending signals to another terminal 67. This terminal 67 is connected to the output of an "OR" circuit 68. This "OR" circuit includes two inputs connected respectively to the terminals 52 and 53 described previously. The input of this "OR" circuit, connected to the terminal 53, is also connected to one end of the winding of the relay R. The other end of this winding is connected to the positive supply terminal.

The output 69 of the gate 65 is connected to one input of an "OR" circuit 70. Another input of this circuit 70 is connected to the terminal 53.

The output 71 of the circuit 70 is connected to the input of an amplifier 72. The output of this amplifier 72 is connected to the terminal 56.

The operation of the limiter device whose electrical circuit is shown in FIG. 4 and FIG. 5 is as follows.

It is assumed that the switch 49 (FIG. 4) is closed and permits the energising of the electrical assembly.

When the limiter device is not engaged, the driver controls the opening of the throttle member 3 by means of the pedal 4, the rod 10 being locked, the bolt 21 ensuring axial holding of the piston 10b with respect to the cylinder 10a.

When the driver wants to engage, at a certain speed, the limiter device, he has only to operate the contactor 26b to close momentarily the contact on the terminal d, when the speed at which he wishes to establish the limitation is reached. For example, to obtain a limitation at 90 km/hour, the limiter device is engaged at the moment when, in normal driving, the speed of 90 km/hour is reached.

The closing of the contact on to the terminal d causes the energising of the electromagnet 22 and the unlocking of the telescopic rod. The driver then presses the accelerator pedal 4 as far as its resistant point 27 (FIG. 1).

The stroke end contact NO of the electro-magnet 22 placed under voltage closes so that the relay RE is energised and causes the closing of the contacts 54. A signal is hence sent to the engagement terminal 53. This signal is transmitted through the "OR" circuit 68 (FIG. 5) to the gate 65 which opens.

In addition, the appearance of the signal at the terminal 53, which corresponds to the grounding of this terminal, permits the energising of the relay R (FIG. 5) and the closing of the contact 63. The speed signal corresponding to the speed at the moment of engagement of the limiter device is then stored in M.

Consequently, on the regulation-limitation the comparator C will send to its output 64 signals resulting from the comparison of the momentary speed signal and the predetermined limit recorded in the storage M at the moment of engagement.

When the driver releases the contactor 26b, which opens the contact to the terminal d, the relay RE is no longer energised, in the same way as the relay R and the electromagnet 22. However, the contact NO remains closed since the bolt 21 does not rest in the groove 24, but against the cylindrical surface of the piston 10b, due to the fact that the rod 10 has not its normal length. A similar explanation applies to the case of the embodiment of FIG. 7, with the microswitch 32.

The gate 65 having been opened, the signals coming from the comparator C are transmitted after amplification, to the electrovalve EV1.

These signals ensure control by the pneumatic jack 13 of the opening of the throttle member 3, so that the speed limit is respected. The regulation operates preferably as all or none.

In normal regulation, the electrovalve EV2 is open and a permanent slow leak is provided between the chamber 15 of the jack and atmosphere.

If for any reason the driver wishes to pass through the limitation and to use the maximum power of the engine, temporarily, for example for overtaking, he has only to thrust against the accelerator pedal 4 to overcome the stop 27.

Under these conditions, the contact 29 first closes. Energising of the winding of the electromagnet 22 results therefrom, since the contact NO is closed.

Thus, the bolt 21 is held separated from its locking position, even if the groove 24 of the piston 10b happens to be in line with this bolt.

Then the contact 30 is closed. Therefrom results the energising of the electrovalve EV2 and the closing of the leak to the atmosphere.

Simultaneously, the electrovalve EV1 is energised, which causes the opening of the passage 16 (FIG. 1) and the permanent admission of suction into the chamber 15.

Under these conditions, the jack 13 will actuate the maximum opening of the throttle member 3, which permits the maximum power of the engine to be obtained.

The pedal 4 being fully depressed, it will be noted that the piston 10b and the cylinder 10a then occupy the relative position corresponding to normal length of the rod. The energising of the electromagnet 22 however prevents the entry of the bolt 21 into the groove 24.

When the driver releases the pedal 4 to come back to the position of abutment against 27, the contacts 29 and 30 open and the limitation-regulation operation resumes.

If the driver wishes to recover control of the vehicle by the accelerator pedal 4, it suffices for him to lift his foot from the pedal again so that when the bolt 21 arrives in line with the groove 24, as a result of the relative movement of the cylinder 10a and of the piston 10b, this bolt 21 will enter the groove 24 under the action of the return means 25.

The locking of the rod then recurs.

The closing of the stroke contact NF of the electromagnet 22 sends a disengagement signal to the terminal 58 through the diode D8. This signal closes the gate 65 (FIG. 5) and puts the regulation-limitation out of operation.

The connection between the terminal 58 and a terminal of the "stop" contact 59 permits a safety feature to be produced. In effect, if for some accidental reason, the contact NF did not close when the driver "lifts his foot" from the pedal 4, it suffices for the driver to operate the brake pedal, which corresponds to a natural reflex, to close the contact 59 and to send a limiter disengagement signal to the terminal 58.

If the driver wishes to place the limitation-regulation in operation again with the previously used predetermined limit, he has only to tilt the contactor 26b to close the contact on to the terminal g to open the gate 65 once more, the comparator C still using as reference the value previously stored in M.

If the driver wishes to use the limitation, with a different speed value, it suffices for him to operate the contactor 26b to close the contactor on d when the new speed selected is reached by the vehicle.

It is to be noted that in the course of regulation-limitation, the driver can, without disengaging the limiter, increase the speed limit, by operating the contactor 26b and by closing the contact on to the terminal d.

Under these conditions, there is sent, through the "OR" circuit 70, a signal to the input of the amplifier 72 so that the electrovalve EV1 will remain open as long as this signal is present, that is to say, as long as the contactor 26b is closed on d.

The opening of the electrovalve EV1 causes the admission of suction into the jack 13 and hence an increase in the opening of the throttle member 3.

Simultaneously, the relay R is energised and the contact 63 is closed.

The speed (or the engine speed) of the vehicle will increase.

The new limit will correspond to the speed reached by the vehicle when the contactor 26b is released.

Figure 11:
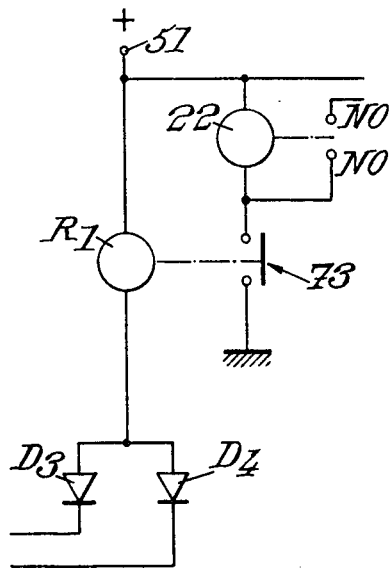
FIGS. 11 to 13 show modifications of parts of the circuit for the control of the locking electro-magnet.

In FIG. 11, is shown a modification of the arrangement of the diodes D3, D4 and of the electromagnet 22. As seen from this FIG. 11, the diodes D3, D4 control an intermediate relay $R_1$ whose winding is connected between the positive terminal 51 and the diodes. One working contact 73 of this relay $R_1$ controls the closing of the supply circuit of the winding of the electromagnet 22. This working contact 73 is arranged between one end of the winding of 22 and ground. When the relay $R_1$ is energised, the contact 73 is closed and enables energising of the electromagnet 22.

The current intensity necessary for the operation of the relay $R_1$ can be very much less than that necessary for the operation of the electromagnet 22, so that the diodes D3 and D4, in the embodiment of FIG. 11, may be of low power.

Figure 12:
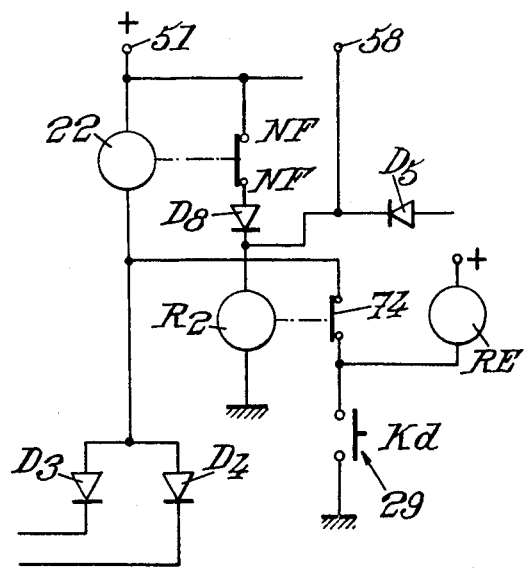

FIG. 12 shows another modification of the arrangement of FIG. 4. In the case of FIG. 12, a single normally closed stroke end contact NF of the electro-magnet 22 is necessary. A relay $R_2$ has its winding connected between the portion of the circuit connecting the cathodes of the diodes D8, D5 and ground. The supply of this relay $R_2$ is controlled by the contact NF of the electromagnet 22. A resting contact 74 of the relay $R_2$ replaces the normally open contact NO of the electromagnet 22. This resting contact 74 is arranged, like the contact NO, between one end of the winding of the relay RE and the point common to the anodes of the diodes D3, D4.

Figure 13:
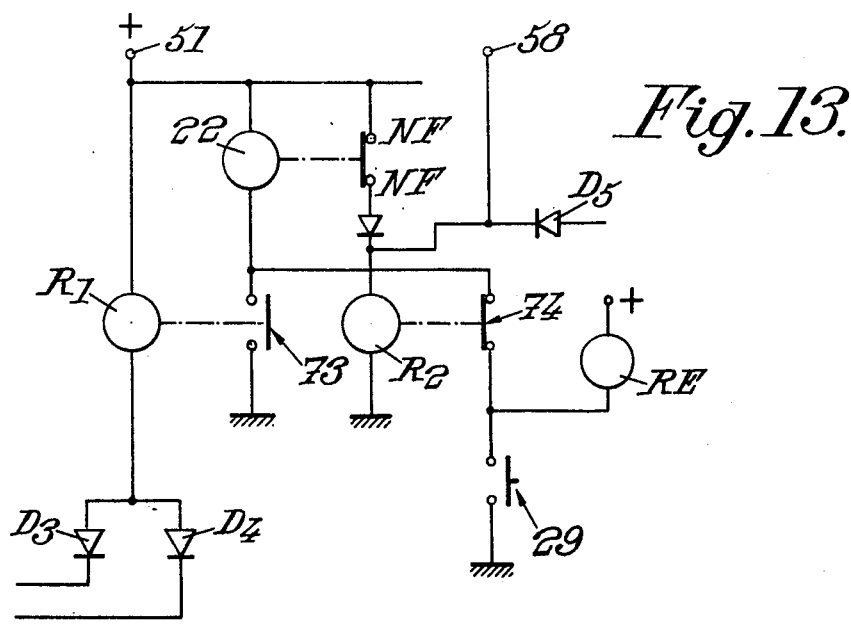

FIG. 13 shows the combination of devices of FIGS. 11 and 12. The various reference numerals having been repeated in FIG. 13, it is unnecessary to describe it in more detail; understanding of the circuit will result from the drawing itself of FIG. 13 and the explanations previously given with FIGS. 10 and 11.

It is to be noted that the presence of the relay $R_2$ between the terminal 58 of locking-disengagement and ground permits the resistor 61 shown in FIG. 4 to be eliminated.

Figure 6:
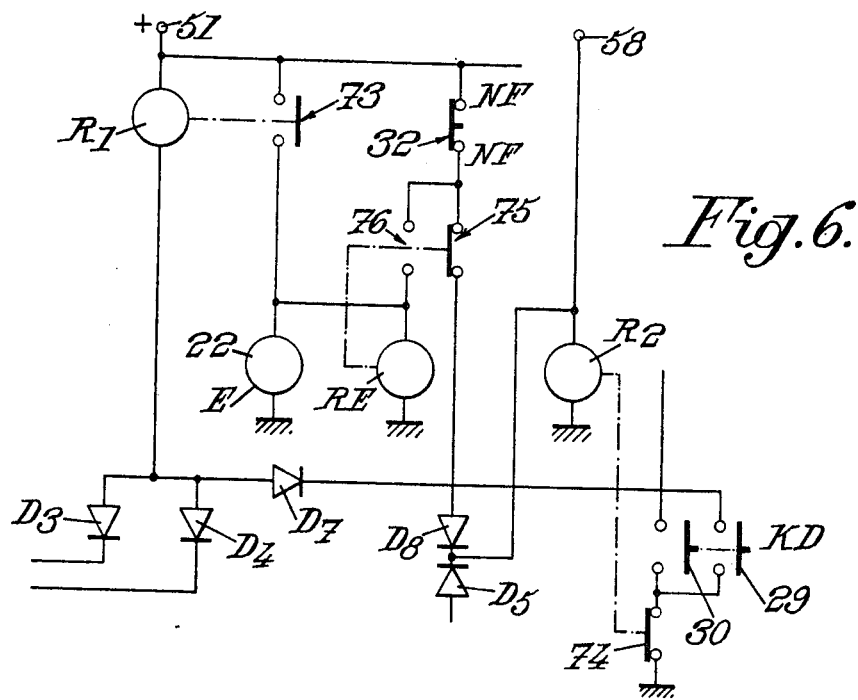
FIG. 6 shows a modification of a part of the connections of the embodiment of FIG. 4 when the telescopic rod is used in combination with a microswitch.

FIG. 6 shows a part of the electrical circuit of FIG. 4 modified to operate with a rod of the type shown in FIG. 7, that is to say a rod in which the electromagnet 22 does not include a stroke end contact; a microswitch 32, suitably arranged, permits the contact NF to be realised, normally closed when the rod is locked.

As seen from FIG. 6, the winding of the electromagnet 22 is connected between one terminal of the working contact 73 of the relay $R_1$ and ground. This relay $R_1$ is mounted similarly to that shown in FIG. 11. The winding of the relay RE is connected in parallel with the winding of the electromagnet 22 between one terminal of the contact 73 and ground. The other terminal of the contact 73 is connected to the positive supply.

One terminal of the contact NF of the microswitch 32 is connected to the positive supply. The other terminal of this contact NF is connected through a resting contact 75, of the relay RE, to the anode of the diode D8. A working contact 76 of the relay RE enables the supply of electric current to the windings of the electromagnet 22 and of the relay RE, through the contact NF of the microswitch 32, as seen in FIG. 6.

As was already the case in FIG. 13, the relay $R_2$, in the device in FIG. 6, is connected between the terminal 58 and ground. The resting contact 74 of this relay $R_2$ is arranged between ground and the terminals of "kickdown" contacts 29, 30, connected in parallel to one terminal of the contact 74.

The operation of the modified circuit of FIG. 6 is as follows.

The relay $R_1$ enables the energising of the electromagnet 22 as well as the relay RE. The latter ensures, by self-supply, due to the working contact 76, the energisation of the electromagnet 22, as long as the contact NF of the microswitch 32 is not open as a result of the modification in length of the telescopic rod (shortening or lengthening of the rod).

When this modification in length takes place, the contact NF opens so that the electromagnet 22 is no longer energised; the core 21 of the electromagnet 22 can in fact no longer then be moved since the groove 24 is displaced, and said core cannot fall back into this groove.

It is to be noted that in the case of FIG. 4, the supply of the relay RE can only occur when the contact NO is closed, on engagement of the device. It is thus ensured, with the arrangement of FIG. 4, that there is no longer locking of the rod when the limiter is engaged.

The assembly adopted in FIG. 6 enables a similar safety feature to be used.

Still in the case of FIG. 6, the opening of the resting contact 75 of the relay RE enables the unlocking of the limiter device on the terminal 58 and consequently its engagement.

The opening of the contact NF of the microswitch 32 causes the relay RE to fall back.

If the driver lifts his foot from the accelerator pedal 4 until the rod resumes its normal length, the contact NF is again closed and a (+) signal is sent to the terminal 58 corresponding to the disengagement path of the limiter device. There is deceleration of the vehicle and return to control of the throttle member 3 by the pedal 4. The assembly of FIG. 6 is compatible with all the telescopic rod 10 embodiments operating by elongation or by shortening.

In the explanations given on the subject of the operation of the limiter device shown in FIG. 4, it has been indicated that on "lifting of the foot" by the driver the telescopic rod 10 locks automatically at its normal length, by the entry of the bolt 21 into the groove 24; simultaneously, the limiter device is disengaged.

It has also been explained that to re-engage the limiter device it was necessary to operate the contactor 26b and to bring it on to the contact g which re-engages the limiter device with a limit corresponding to that placed in the storage M.

Such a manoeuver of the contactor 26b is annoying in speed limitation when "lifting of the foot" has permitted recovery of normal accelerator control by the pedal 4 and has resulted in deceleration of the vehicle by disengagement of the device.

Figure 14:
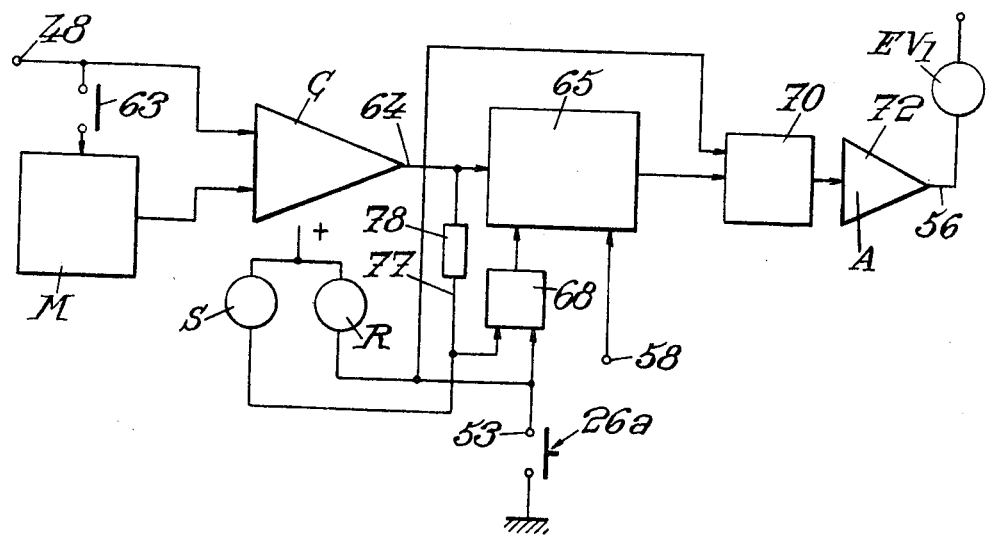
FIG. 14 is a block diagram of another embodiment of a limiter device according to the invention.

FIG. 14 of the drawings shows a diagram of an embodiment of a limiter device according to the invention which permits manual re-engagement to be replaced (contactor 26b and contact g) by automatic re-engagement at the speed placed in storage in M, on the preceding engagement.

For this, the control of the opening of the gate 65 is ensured by the swinging or tilting of the signal at the output of the comparator 64, which tilting occurs when the speed or engine speed of the vehicle reaches a value equal to the limit stored in the memory M.

As seen in FIG. 14, the output from the comparator 64 is connected, through a connection 77, to one input of the "OR" circuit 68.

A shaping circuit 78 may be if necessary provided between the output of the comparator 64 and the input of the "OR" circuit 68.

A relay S is mounted so as to be controlled also by the swinging of the signal at the output 64 of the comparator.

Generally, this comparator operates as all or none so that at the output 64 there is a signal "1" or "O" according as the speed or the engine speed of the vehicle is less than or greater than (or equal) to the predetermined limit. The "1" signal is constituted, for example, by the positive voltage (12 volts for example), at the output 64, whilst the " " signal is constituted by a zero voltage at the output 64.

The winding of the relay S is connected between the positive voltage and the output 64 or the output of circuit 78. When the signal "0" appears at the output 64 or at the output of the circuit 78, the relay S is energised.

The other electrical connections are similar to those of FIG. 5 and FIG. 4, as emerges from comparison between these Figures and FIG. 14.

The relay S is however provided to ensure energising of the electromagnet 22.

Figure 16:
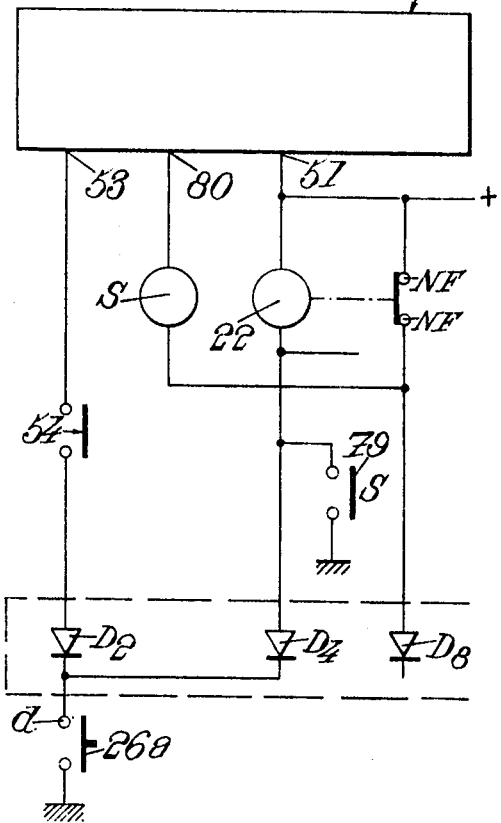
FIGS. 16 and 17 show modifications of the electrical control circuit.
Figure 17:
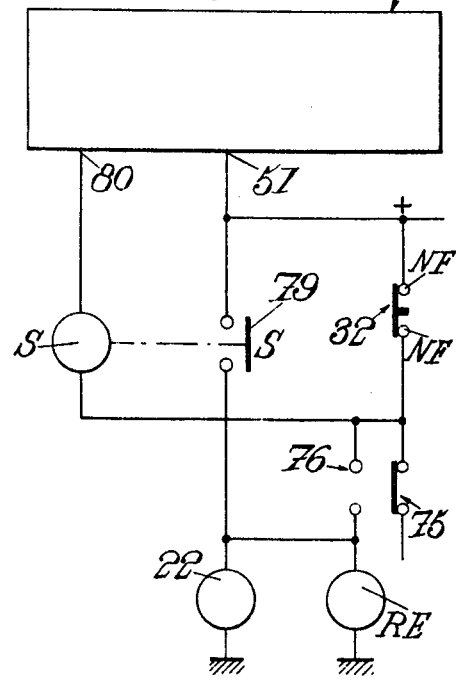

The connection of this relay S and of its working contact 79 is illustrated in FIGS. 16 and 17 which show respectively the modifications applied to certain parts of FIGS. 4 and 6.

FIG. 16 relates to the case where the electromagnet 22 comprises a normally closed stroke end contact NF. An arrangement similar to that shown in FIG. 4 will again be found here.

However, the contactor 26a only includes one unstable position corresponding to the contact d for the engagement of the limiter device. The diodes D2, D4 whose cathodes are connected to this contact d are to be found again here.

The winding of the relay S is connected between the positive supply through the stroke end contact NF of the electromagnet 22 and a terminal 80 connected to the output 64 of the comparator C (FIG. 14) or to the output of the circuit 78.

The working contact 79 of the relay S is connected between ground and the end of the winding of the electromagnet 22 connected to the anode of the diode D4.

In the case of FIG. 17, corresponding to a rod equipped with a microswitch of the type shown in FIG. 7, the electromagnet 22 and the relay RE are connected between the (+) supply and ground in the same way as shown in FIG. 6. However, the working contact 73 of FIG. 6 is replaced by the working contact 79 of the relay S.

This relay (FIG. 17) is connected between the terminal 80 and the terminal common to the resting 75 and the working 76 contacts of the relay RE, which terminal is itself connected to a contact terminal NF of the microswitch 32.

The limiter device according to FIG. 14 combined with FIGS. 16 or 17, has a general operation similar to that described with reference to FIG. 4.

However, the re-engagement of the limiter device after a "lifting of the foot" is automatic.

For this reason driving is much more comfortable.

The driver engages the limiter device by operating the contactor 26a, at a suitable speed and presses the accelerator pedal 4 as far as its resistant point. The regulation-limitation progresses normally.

If the driver lifts his foot, the limiter device is disengaged, the car decelerates and the control of the throttle member 3 becomes normal again, through the pedal 4.

The driver drives normally at speeds less than that which is stored in the memory M.

If the driver accelerates and again reaches the speed stored in the memory, the limiter is automatically re-engaged and the pedal 4 returns to the resistant point.

Nothing is changed as regards the "kick-down"and manual advance. and

The driver always has the possibility of disengaging the limiter by acting on the start-stop switch 49 (FIG. 4).

On automatic re-engagement, if reference is made to FIGS. 16 or 17, it is seen that the relay S is energised and the working contact 79 closes. The electromagnet 22 is then energised which enables the unlocking of the telescopic rod.

It is to be noted that in the case of automatic re-engagement of the limiter, operation with the speed threshold stored in the memory M must occur, if the gearbox is an automatic gearbox, with the vehicle speed data and not with the engine speed data.

In the case of a mechanical gearbox, it is possible to cause the limiter device to operate with the engine speed, but by providing a contactor on the highest gear ratio so that the limiter device is disengaged for a different gear ratio.

With a limiter device, on automatic re-engagement, such as that shown in FIG. 14, it is possible to replace the gear manual engagement contactor 26a by any gear preselection device which enables the setting on an input of the comparator of a reference value to which the speed signal derived from 48 will be compared.

The gear preselection device can be a continuous adjustment knob with or without a preselection index, or a keyboard with or without additional adjustment.

The driver sets his limiting speed and the swinging of the signal at the output of the comparator 64, resulting from comparison of the speed signal and of this limiting speed, engages the limiter device.

In the course of limitation-regulation, the driver can accelerate by adjusting the preselection device to the higher speed or decelerate by regulating it to the lower speed; this acceleration and this deceleration are effected manually.

Figure 15:
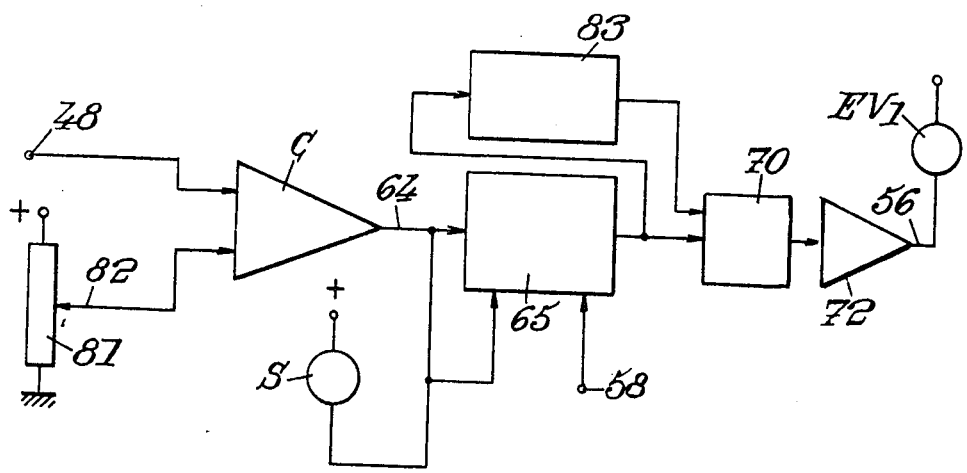
FIG. 15 is a diagram similar to that of FIG. 14 in the case where the predetermined speed limit is constituted by an adjustable reference.

In the example shown in FIG. 15, the preselection device, which replaces the storage M, is constituted by an external reference represented by a potentiometer 81, constituting a voltage divider between the positive supply and ground. The intermediate voltage take-off on this potentiometer 81, constituted by the cursor 82, is connected to the input of the comparator C on which the storage M was connected (FIG. 14).

A monostable circuit 83 is connected to the output of the gate 65. The output from this monostable 83 is connected to an input of the "OR" circuit 70.

This monostable element 83 is designed to be triggered on the opening of the gate 65. It enables a signal to be maintained at the input of the amplifier 72 for a certain time and hence to keep the electrovalve EV1 open, which ensures the admission of suction into the jack 13 on the engagement of the device.

This permits the normal correspondance to be obtained; excessive speed = jack opening the throttle valve too much = too much suction admitted. This function was ensured in the absence of the preselection device such as 81, by the manual engagement contactor 26b, 26a.

It is desirable not to notice any jerk at the moment of automatic re-engagement of the limiter device, in the acceleration phase. Such a jerk may be due to the sudden opening of the throttle member 3 when the electromagnet 22 of the telescopic rod is energised. In fact, when the limiting speed is reached and the automatic re-engagement occurs, the pneumatic jack 13 has not yet been able to take up the position corresponding to the suitable opening of the throttle member 3.

In the circuits of the limiter devices described up to this point, the electrovalve EV1 is closed while EV2 is open, when the limiter device is not engaged; it results therefrom that the jack 13 is connected to the atmosphere and that the chain 20 is not tightened when the limiter is re-engaged.

The embodiments of the telescopic rods shown in FIGS. 8 to 10 and described previously, enable this drawback to be overcome.

The microswitch 32a which forms the "acceleration-deceleration" contact enables suction to be admitted into the jack 13, in acceleration, when the limiter device is not engaged and one is below the speed threshold. Thus, the chain 20 is always tight at the moment of automatic re-engagement thus avoiding a sudden closing of the throttle valve 3.

As previously explained in FIGS. 8 and 9, the adjustment of the microswitch 32a is such that the contact NF changes state in the play of the locked telescopic rod, the groove 24a being wider than the bolt 21.

In the case of FIG. 8, assuming that the linking means L are of the "pusher" type that is shown in FIG. 1, one is in acceleration phase. In fact, the position of the bolt 21 supported against the leading edge 35 indicates that the cylinder 10a pushes the piston 10b towards the right, which corresponds to an order to open the throttle valve 3. The contact NF of the micro-switch 32a, which is then open, is used to actuate the supply of the winding of the electrovalve EV1 and hence the opening of this electrovalve. The suction of the manifold 2 is admitted into the jack 13.

The suction is admitted until contact NF again closes, as shown in FIG. 9.

This opening corresponds to two cases. The first case is that where the jack 13 has taken a suitable position corresponding to opening of the throttle valve 3. The jack has the same tendancy to pull the piston 10b, so that the bolt 21 becomes supported against the other leading edge 36 of the groove 24a.

The second case is that where the driver has lifted his foot from the pedal 4; the cylinder 10a is hence pulled back towards the left of the drawings and draws the piston 10b; there will be deceleration and no automatic re-engagement.

Figure 18:
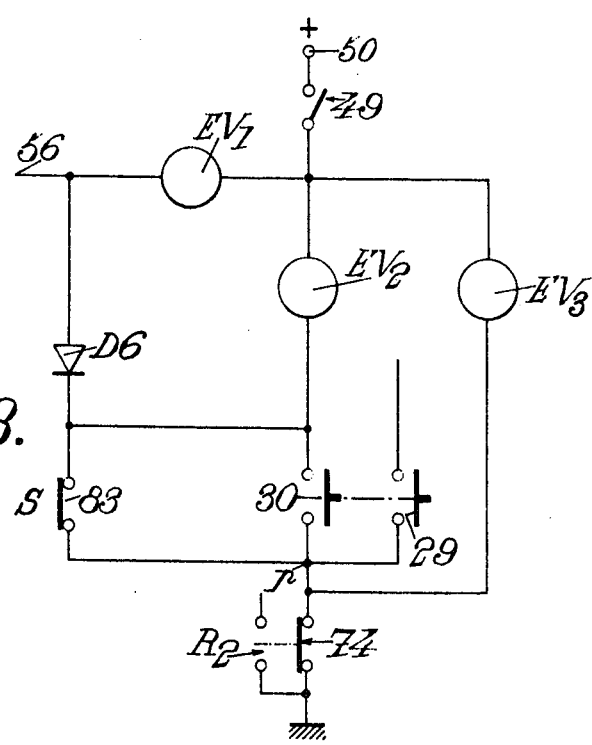
FIG. 18 shows a part of the control circuit of three electrovalves of which one controls the admission of suction into the pneumatic jack of the limiter device and of which the two others control respectively a slow leak and a fast leak for placing the jack to the atmosphere.

FIG. 18 shows a possible control circuit for the electrovalve EV1 used in combination with a telescopic rod including a "acceleration-deceleration" contact.

This circuit is derived from the corresponding part of the previously described circuits, in particular FIGS. 6 for R2 and FIGS. 16 and 17 for S, by the following modifications.

A resting contact 83 of the relay S (FIGS. 16 and 17) is arranged between the cathode of the diode D6 and the common point p of the "kick-down" contacts 29 and 30. The cathode of the diode D6 is in addition directly connected, as in FIG. 4, to the terminal of the contact 30 connected to the electrovalve EV2.

As in FIG. 6, a resting contact 74 of the relay R2 (not shown, but connected as shown in FIG. 6), is arranged between the common point p and ground.

An electrovalve EV3 designed to control rapid communication of the jack 13 to the atmosphere as explained below, is connected between the point p and the switch 49.

In an assembly such as that in FIG. 15 which must be completed by suitable parts of FIG. 6, of FIG. 4 and of FIGS. 16 and 17, the microswitch 32a of FIGS. 8 and 9, comes into play eventually through its normally closed contact NF.

The electromagnet 22, in the case of FIG. 18, is connected as in FIGS. 16 or 17 since the automatic re-engagement through the relay S is involved.

On the operation of the vehicle, below the speed threshold, that is to say when the limiter device is not engaged, the relay S is at rest and the resting contact 83 is closed.

When the driver, by operating the pedal 4, actuates an increase in the opening of the throttle valve 3 and hence an acceleration, the telescopic rod occupies the position of FIG. 8 and the contact NF of the microswitch 32a is opened. The supply of the relay R2 being controlled by this contact NF, when there is acceleration below the speed threshold, the relay R2 is at rest. The contact 74 (FIG. 18) is hence closed.

The electrovalve EV1 is hence energized; the supply circuit of this electrovalve starts from the closed switch 49, passes through the diode D6, the contact 83 and the contact 74.

When the driver lifts his foot from the accelerator or when the pneumatic jack 13 has a tendency to pull the piston 10b (case of FIG. 9), the contact NF of the microswitch 32a closes so that the relay R2 is energized and the contact 74 opens. The electrovalve EV1 is no longer energized and suction is no longer admitted into the jack 13.

Under these conditions, the chain 20 remains tensioned when the limiter device is not operating, which permits a jerk on the automatic reingagement of the limiter to be avoided.

It is clear that the modification of the telescopic rod shown in FIG. 10 provided with the "acceleration-deceleration" contact formed by the plates 42, 43 would permit the obtaining of a similar mode of operation.

On "lifting his foot", when the driver releases the pedal 4, it has been previously explained that the limiter device is disengaged and the jack 13 resumes its normal resting configuration due to the slow leak to the atmosphere, controlled by the electrovalve EV2.

As a result the closing of the throttle member 3 is slow in the case of "lifting of the foot" in regulation-limitation conditions, which results in a decrease in the engine brake and consequently in the effectiveness of the deceleration.

To eliminate this drawback, it is advantageous to provide an electrovalve EV3 controlling a rapid leak between the chamber 15 of the jack 13 and the atmosphere.

The control of this electrovalve EV3 is ensured by an "acceleration-deceleration" contact of the type of the microswitch 32a of FIGS. 8 and 9, or of the plates 42, 43 of FIG. 10.

As shown in FIG. 18, this electrovalve EV3 can be connected between the switch 49 and the common point p of the contacts 29 and 30 connected to one terminal of the resting contact 74 of the relay R2. This relay R2 is itself controlled through the "acceleration-deceleration" contact.

The electrovalve EV3 is mounted so that when it is energized, the rapid leak is closed.

The rapid leak is opened when this electrovalve EV3 is not energized. The arrangement is such that the rapid leak is created when the limiter device is not engaged and the foot is lifted from the pedal 4 (deceleration).

The arrangement of FIG. 18 combined with FIG. 6, responds well to these conditions since the relay R2 (FIG. 6), having the resting contact 74, is energized by the contact which is established on deceleration: contact NF of the microswitch 32a namely the contact between the plates 42, 43 of FIG. 10. In deceleration R2 is energized and 74 is opened, hence EV3 is not energized and the rapid leak is open.

In acceleration or in regulation, the "acceleration-deceleration" contact, is open so that the relay R2 is at rest and its resting contact 74 is closed. The electrovalve EV3 is energized and the rapid leak is closed.

It will be noted that the closing of this rapid leak when EV3 is energized constitutes a safety feature.

Figure 19:
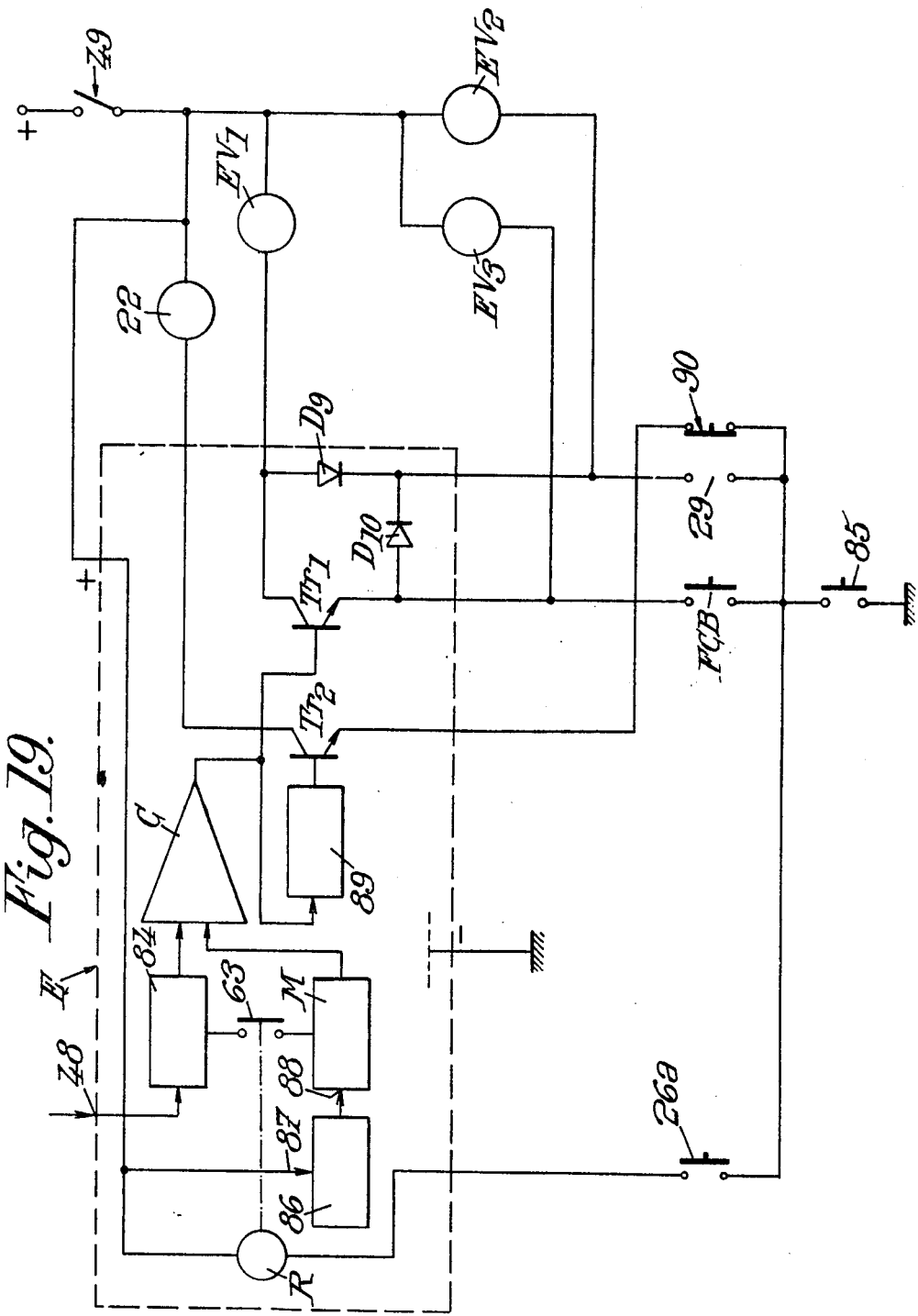
FIG. 19 is a block diagram of a speed limiter device according to the invention, comprising a fast leak and a slow leak for placing the jack to the atmosphere and means sensitive to the direction of the force transmitted by the telescopic rod.

Referring to FIG. 19, there is to be seen a simplified diagram of a limiter device according to the invention utilizing the presence of an "acceleration-deceleration" contact of the type shown in FIGS. 8 to 10, to eliminate the gate 65 (FIGS. 5, 14 and 15) of the electronic control and, at the same time, to eliminate the disengagement-locking path 58 (closing of the gate) and the internal reingagement path 53 (opening of the gate).

The electro-magnet 22 used in the diagram of FIG. 19 may be without a stroke-end contact.

The speed data arriving at the terminal 48 is led to one input of the comparator C through, if necessary, a shaping circuit 84.

As explained previously, if the speed data is constituted by the engine speed, a contactor 85 is provided on the top ratio of the gear box. This contactor only permits engagement and operation of the limiter device at this top ratio.

The storage M and the comparator C of FIGS. 5, 14 and 15 are again to be found, as well as the relay R whose working contact 63 enables speed data to be fed into the storage M.

A circuit, for example a capacity divider 86 whose input 87 is connected to the positive supply is provided to form at its output 88 a transient signal of the initial condition corresponding to a speed greater than that which the vehicle can reach. This output 88 is connected to the storage M.

The storage M can include a capacity connected between ground and a terminal of the contact 63, this terminal being itself connected to the input of the comparator C. The capacity divider 86 is then constituted by a capacitor, having a value very much higher than that of the storage, connected between the switch 49 and the terminal of the contact 63 connected to the input of C.

The output from the comparator C is connected to the base of a transistor TR1, of the NPN type in the example shown.

The electrovalve EV1 has its winding connected between the collector of this transistor TR1 and the positive supply. The emittor of the transistor TR1 is connected to the ground through the contact of the rod FCB which is closed in acceleration or in regulation and limitation. The contactor 85 of the top gear of the gear box is connected between ground and one terminal of this contact FCB.

The output from the comparator C is also connected to one input of the circuit 89 enabling a threshold to be established for the automatic re-engagement of the limiter.

The circuit 89 is arranged to integrate the complement of the output signal from C. For this, the circuit 89 comprises a first part fed at its input by the output signal from C and giving, at its output, the complement of the output signal of C. This complement is sent to the input of a second part of 89, formed by a conventional resistance-capacity integrator circuit. The output from this integrator circuit is connected to the base of a transitor TR2 also of NPN type in the example shown. The winding of the electromagnet 22 is connected between the collector of this transistor TR2 and the positive supply. The emitter of this transistor TR2 is connected to ground through a resting contact 90 of the "kickdown" element.

The slow leak electrovalve EV2 is connected between the positive supply and ground through a working contact such as "kick-down" 29. The fast leak electrovalve EV3 of the jack 13 is connected between the positive supply and the emitter of the transistor TR1 upstream of the contact FCB.

The manual engagement contactor 26a is connected between one end of the winding of the relay R and the terminal of the contact of the gear box 85 other than that connected to ground.

A diode D9 is connected between the collector of the transistor TR1 and one terminal of the contact 29. The anode of the diode D9 is connected to the collector of TR1 whilst the cathode is connected to the terminal of 29.

As second diode D10 has its anode connected to the emitter ot TR1, upstream of the connection with the winding of the electrovalve EV3. The cathode of this diode D10 is connected to the cathode of the diode D9.

The operation of the device of FIG. 19 is as follows.

Two prior conditions must be fulfilled for the device to be operable. The general switch 49 must be in "on" position, that is to say be closed; the initial condition circuit 86 then sends data corresponding to the maximum speed into the storage M. It is also necessary, in the case where the speed data comes from the engine speed, for the highest ratio of the gear box to be engaged, which corresponds to the closing of the contact 85.

The stored speed being maximum, the speed data coming from 48 is necessarily less than this maximum value. The comparator C then indicates that the speed of the vehicle or of the engine is less than that placed in the memory as reference and the signal delivered by the comparator C, at its output, actuates the conduction of the transistor TR1 whilst the transistor TR2 is blocked.

On acceleration (the rod being locked) by acting on the pedal 4, the contact FCB is closed so that the electrovalve EV1 through the conducting transistor TR1, and the electrovalve EV3 are energised. The suction in the intake manifold acts on the jack which tends to open the throttle member 3 whilst the rapid leak is closed due to the fact that EV3 is energised.

If the action of the jack 13 tends to pass beyond that of the accelerator pedal 4, the contact FCB opens. The jack 13 no longer has an effect due to the fact of the opening of the fast leak since EV3 is no longer energised. Simultaneously, EV1 no longer being energised, the admission of suction into the jack 13 is closed.

It should be noted passing, that the admission of suction into the jack is effected when the fast leak is closed and when this fact leak is opened the jack is isolated from the intake manifold. In no case therefore is there establishment of communication between the intake manifold, downstream of the throttle member 3, with the atmosphere.

The action of the jack 13 will decrease and the contact FCB will again close.

The jack 13 is hence a "follower" jack whose position will always be adapted to the opening of the throttle valve 3, before the engagement or the re-engagement of the limiter device.

On manual engagement, at the selected speed, by closing of the contact 26a, the storage M is updated since the relay R is energised and its working contact 63 closed.

In addition, the transistor TR2 is made conductive which places the electromagnet 22 under voltage. The telescopic rod 10 is unlocked and the accelerator pedal 4 can travel to the resistant point 27 (FIGS. 1 and 2). The contact FCB is closed and the electrovalve EV3 energised closing the fast leak.

Regulation is ensured by the transistor TR1 which controls the energisation of the electrovalve EV1 according to the error signal supplied at the output of the comparator C.

If the resistant point is overcome so as to reach the "kick-down" the contact 29 is closed which directly actuates the energising of the electrovalves EV1 and EV2. The energisation of this last electrovalve causes the closing of the slow leak. The electrovalve EV3 is then energised. The suction of the manifold is hence admitted into the jack and any leakage of the jack to the atmosphere is closed. The jack 13 will hence actuate, to the maximum of its possibilities, the opening of the throttle valve 3.

The "kick-down" contactor is a throwover switch in order to avoid automatic re-engagement, with the foot pressed fully down, in the case where the pneumatic jack would not permit the full opening of the throttle valve 3 to be ensured with the corresponding residual suction. In such a case in fact (below the threshold, telescopic rod locked, one accelerates to the full beyond the resistant point), in spite of the "follower jack" device, the chain will not be tight since, at minimum suction (throttle valve widely open) the jack does not act sufficiently. If, in passing through the re-engagement threshold, the electro-magnet 2 were energised, closing of the throttle valve would result which would cause a jerk and a drop in the performance of the vehicle.

With the "kick-down" throw-over switch contact, the contact 90 opens before the closing of the contact 29 thus preventing the unlocking of the telescopic rod in the case of full acceleration and "kick-down" being overcome below the threshold.

With a jack which does not act sufficiently, the connection through the diode D10 is not necessary : in fact, its purpose is to ensure, whilst forming a barrage for the winding of the electrovalve EV1 through the diode D9 and through the contact FCB, the energising of the electrovalve EV3 in "kick-down" if the contact FCB, closed in acceleration and in limitation-regulation, became opened due to the fact of the action of the jack on the telescopic rod, even with the foot fully down, the rod having then recovered its normal length and the contact FCB being able to be reopened.

In the case of a jack which is sufficiently active to ensure the full opening of the throttle valve 3, the diode D10 is indispensable, but the "kick-down" contactor may be simple with a single working contact 29. In this case the emitter of the transistor TR2 may be connected to the terminal of the contact FCB which is itself connected to the emitter of the transistor TR1.

The diode D9 permits the energisation of the electrovalve EV1 on "kick-down" to be actuated whilst forming a barrage for the electrovalve EV2 which could be actuated, in regulation-limitation, by the transistor TR1.

On "kick-down", there is hence acceleration and it is possible to place in storage the new speed reached due to 26a.

On leaving the "kick-down", the limitation to the initial speed or to the new speed placed in the memory, as the case may be, is recovered.

In the case of "lifting of the foot" from the pedal 4, the contact FCB is opened when the telescopic rod recovers its normal length, the electrovalves EV1 and EV3 are no longer energised and the fast leak of the jack 13 causes the closing of the butterfly valve 3, which results in the deceleration of the vehicle.

Below the speed threshold, TR2 is blocked and the electromagnet 22 is no longer energised. The rod 10 is hence locked and it is possible to accelerate again with a "follower jack".

When the threshold is reached (speed stored in the memory), outside of "kick-down", the transistor TR2 conducts, the electromagnet 22 is supplied and the limiter is hence re-engaged, the rod being shorted.

If the threshold is reached on "kick-down", TR2 does not conduct, since the resting contact 90 is open and the re-engagement has not taken place. It takes place if one leaves the "kick-down"; the electromagnet 22 is then energised and the rod is shortened.

FIGS. 20 to 24 relate to an embodiment enabling the improvement of the performance of a permanent slow leak single electro-pneumatic jack (actuated by electrovalve EV2). The admission of suction into this jack is always controlled by a single electrovalve EV1.

Referring to FIG. 19, it can be observed that the slow leak is closed by the electrovalve EV2 in the case of a "kick-down", by closing of the contact 29. This permits the more rapid and fuller opening of the throttle valve 3 in case of need.

In the case of normal limitation-regulation operation, outside of "kick-down", the electrovalve EV2 is never energised and the slow leak is never closed.

In the case where the vehicle enters a path of steep slope, the electronic control signal of the electrovalve EV1 will be stabilised at the state which corresponds to the energising of EV1. This state is generally the "0" state. Suction is admitted into the jack with the maximum of opening of EV1 in order to open the throttle valve 3 to the maximum.

However, the efficiency of the jack is reduced due to the fact of the slow leak which is not closed by EV2; as a result the full opening of the throttle valve 3 will not necessarily be obtained, so that the speed of the vehicle can decrease appreciably, although the performance of this vehicle, if the throttle valve 3 were open to the maximum, would permit a practically constant speed to be maintained.

However, it is not possible to eliminate or even to reduce the slow leak permanently since the stability and the comfort of regulation are quickly impaired on a flat or descending terrain.

The diagrams of FIGS. 23 and 24 show precisely an embodiment which permits these requirements to be satisfied by the reduction and then the closing of the slow leak on entering a hill climb period.

In a way, FIGS. 23 and 24 show means sensitive to the torque demanded at the engine of the vehicle. Means are also provided to compare the demanded torque with a predetermined value. When the demanded torque reaches or exceeds the predetermined value, the assembly is adapted to actuate the closing of the electrovalve EV2, in order to permit the maximum power of the engine to be obtained to provide a torque equal to that demanded to maintain the speed of the vehicle constant.

In the embodiment of FIGS. 23 and 24, the means sensitive to the demanded torque are constituted by the duration of the control signal of the opening of the electrovalve EV1.

Figure 20:
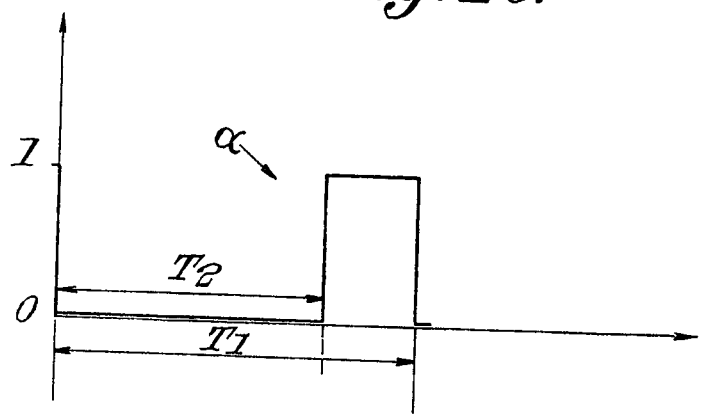
FIG. 20 shows the control signal of an electrovalve controlling the admission of suction into a pneumatic jack.

This control signal α is shown in FIG. 20. It is formed by the electronic assembly of the speed limiter.

The period T1 of this control signal is constant. The actuating period T2 (state "0") of the electrovalve EV1 is variable. On a descent, T2 is very small; on flat terrain, T2 is small; on an ascent, T2 increases and can reach the value T1, which corresponds to maximum conduction (EV1 kept permanently open).

It is thus seen that T2 constitutes a means sensitive to the torque demanded at the engine.

To determine under what conditions of closing the electrovalve EV2 must be actuated, it suffices to select a predetermined limit T3 which will correspond to a duration of opening of the electrovalve EV1 which cannot be obtained on descent or on level ground.

T3 corresponds, in a way, to a predetermined value of the engine torque. This constant duration T3 can be supplied by a monostable circuit 91 (FIG. 91).

The device of FIGS. 23 and 24 is arranged to keep the permanent leak open for all the states "0" applied to EV1 having a duration less than T3.

Figure 21:
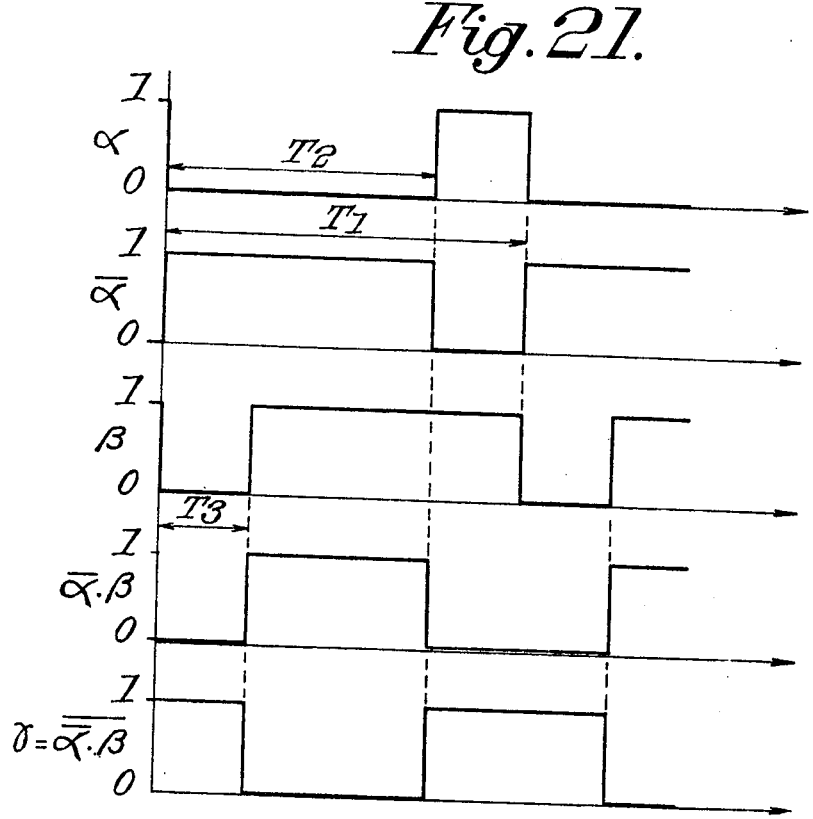
FIG. 21 shows the successive processing phases of the control signal of the electrovalve mounted on the slow leak of the pneumatic jack.

In FIG. 21, there is shown diagrammatically, on the first line, the actuating signal α of the electrovalve EV1. The third line of the FIG. 21, shows the signal β given at the output from the monostable element 91, which is triggered at the beginning of the period T1. The triggering of this monostable is obtained, for example, by using the reverse signal $\bar{a}$, shown in the second line of FIG. 21, of the actuating signal $a$ of EV1.

The fifth line of FIG. 21 shows the actuating signal $\gamma$ of the electrovalve EV2. The closing of the slow leak, (energising of the electrovalve EV2, that is to say state "0" for the signal $\gamma$) starts at the end of the period T3 and ends at the end of the period T2.

To obtain this actuation, there is used, as seen in FIG. 23, a transistor TR3, for example of the NPN type, whose collector is connected to one end of the winding EV2 and whose emitter is connected to ground. The base of this transistor is connected, through an assembly 92, to the collector of the transistor TR1 shown in FIG. 19. This circuit 92 is hence connected also to the end of the winding of EV1 connected to the collector of TR1.

The other end of the winding of EV2 is connected to the positive terminal 50 through the switch 49. The collector of the transistor TR3 is in addition connected to the anode of a diode D11 whose cathode is connected to the common point of the cathodes of the diodes D9 and D10.

FIG. 24 gives a more detailed diagram of the circuit 92. The input terminal 93 of this circuit is connected an inverter circuit 94.

The output 95 of this circuit is connected to the input 96 of the monostable 91 and to one input of an "AND" gate 97. The output 98 of the monostable 91 is connected to another input of this "AND" gate 97. The output 98a of the "AND" gate is connected to the base of the transistor TR3.

The diode D11 permits the electrovalve EV2 to be supplied through the "kick-down" contact 29, whilst forming a barrage between the EV1-D9 and TR3.

The signal entering the inverser 94 is the signal $a$, shown on the first line of FIG. 21.

The output signal 94 is the signal $\bar{a}$ (compliment). This signal $\bar{a}$ triggers the monostable 91 which introduces a delay T3 of which the output is reversed to give the signal $\beta$.

The "AND" circuit 97 gives the signal $\bar{a},\beta$ shown at the fourth line of FIG. 21. This signal is reversed by the transistor TR3 which supplies finally the signal $\gamma = \overline{\bar{a},\beta}$.

Figure 25:
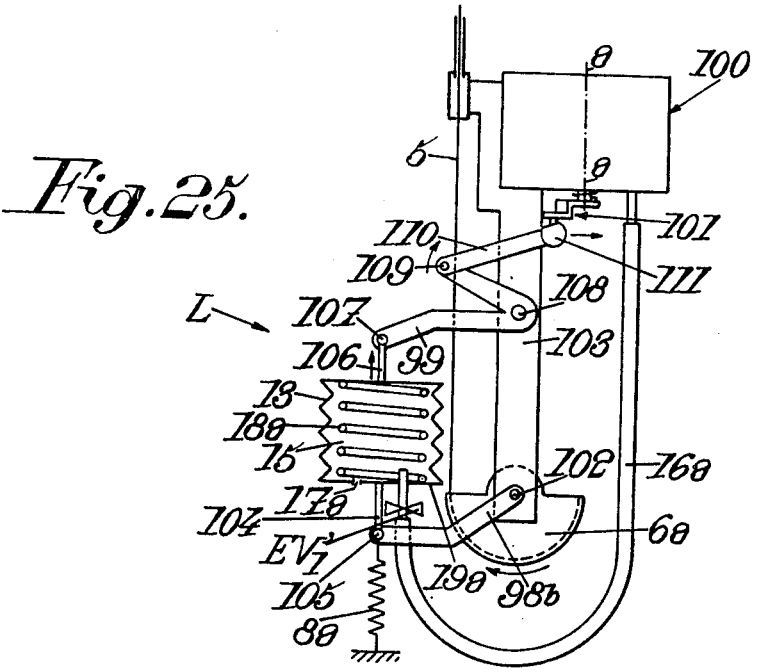
FIG. 25 shows a modification of the assembly of the pneumatic jack, inserted in the linking means.

Referring to FIG. 25, can be seen a particularly simple and econmic modification of a limiter device according to the invention.

In the preceding embodiments, notably those shown in FIGS. 1 and 2, the base 19 of the pneumatic jack 13 was fixed with respect to the structure of the vehicle.

In the embodiment of FIG. 25, the whole of the jack 13, and notably its base 19a, is movable.

As is clearly seen from FIG. 25, the electropneumatic jack 13 is inserted by means of two levers 98b,99, between the circular sector 6 actuated by the cable 5 connected to the accelerator pedal not seen in FIG. 25, and the butterfly valve of the carburettor. This carburettor has been shown diagrammatically by a rectangle 100 in FIG. 25. The lever 101 enabling the control of the position of the butterfly valve has also been shown.

The sector 6 is mounted on an axle 102 borne on a support 103. The lever 98b, in the form of a wide V, is fast in rotation, to one end of the sector 6. For this, for example, the axle 102 is mounted rotatively in the support 103, whilst the sector 6 and the lever 98b are fast in rotation to each end of the axle 102. The sector 6 and the lever 98b are arranged on both sides of the support.

The other end of the lever 98b is subject to the action of the return spring 8a of the accelerator pedal. This spring 8a plays a role similar to that of the spring 8 of FIGS. 1 and 2.

A rod 104, fast to the base 19a of the jack 13 and fixed to the centre of this base is pivoted at its end, at 105 to the end of the lever 98b connected to the spring 8a.

The transverse wall of the jack 13, spaced from the base 19a and forming the bottom of this jack, is connected by a rigid rod 106 to one end of the lever 99. This rod 106 is fixed to the center of the front wall of the jack 13 and is connected by pivot 107 to the end of the lever 99.

This lever 99 has the general shape of a V with unequal arms, the large arm of this V being itself bent and having its end connected to the rod 106, as will be clearly seen from the drawing. The zone of the lever 99 forming the apex of the V is pivoted on a rotary axle 108 borne by the support 103. The end of the small arm of the lever 99 is pivoted at 109, on the end of a rod 110. The other end of the rod 110 is pivoted on a spherical ball joint 111 of the lever 101 of the gas throttle valve.

There have been shown, diagrammatically, by arrows, the movements of the various elements on traction on the cable 5, exerted from the accelerator pedal and corresponding to opening of the gas throttle valve. The lever 101 effects a rotation in a plane perpendicular to the geometric axis of rotation $a—a$ of the gas throttle valve, as shown by the arrow.

A duct 16a playing a role similar to the duct 16 of FIGS. 1 and 2, forms a communication between a suction take-off in the intake manifold at the engine, and an input orifice in the inner chamber of the jack 13.

The opening or closing of this intake orifice is controlled by an electrovalve EV'1; an opening 17a of reduced section, is provided in the wall 19a to establish permanent leak to the atmosphere from the chamber 15.

The control of the electrovalve EV'1 is effected from the electronic means which will be described in more detail with reference to FIG. 26, when the limitation-regulation is engaged, as a function of the speed or of the engine speed of the vehicle.

Outside of regulation, the electrovalve EV'1 is not energised and is closed so that the suction of the engine is not admitted into the jack 13 whose chamber 15 is at atmospheric pressure. The jack 13 therefore has its maximum length.

The stiffness of the spring 18a of this jack 13 is selected so that it can transmit to the gas throttle valve, up to fully open position, the force exerted on the accelerator pedal.

Thus, outside of regulation, there is "normal" accelerator control since the length of the jack 13 remains equal to the maximum length, due to the sufficient stiffness of the spring 18a.

The arms of levers 99 are selected so that for the "foot to the floor" position the throttle valve is at maximum open position when the jack 13 is connected to the atmosphere and the throttle valve is completely closed when the suction admitted into the chamber 15 compresses the jack.

Under these conditions, it is seen that it is possible to drive with the "foot to the floor" when the limitation-regulation is engaged, since then, the variations in length of the jack 13 actuated by the electronic means according to the speed will permit the speed to be maintained at the predetermined value.

The arrangement of the jack 13, adopted in FIG. 25, makes it possible to fulfill, with this single jack 13, the functions filled by the telescopic rod and by a jack 13 whose base 19 is fixed, as is the case of embodiments of FIGS. 1 and 2.

A stop similar to the stop 27 of FIGS. 1 and 2, combined with the spring 28, is provided to permit driving in limitation-regulation with the pedal 4 fully depressed. A "kick-down" is preserved, with a contact 90 (FIG. 26) adapted to open when the stop 27 is passed.

Figure 26:
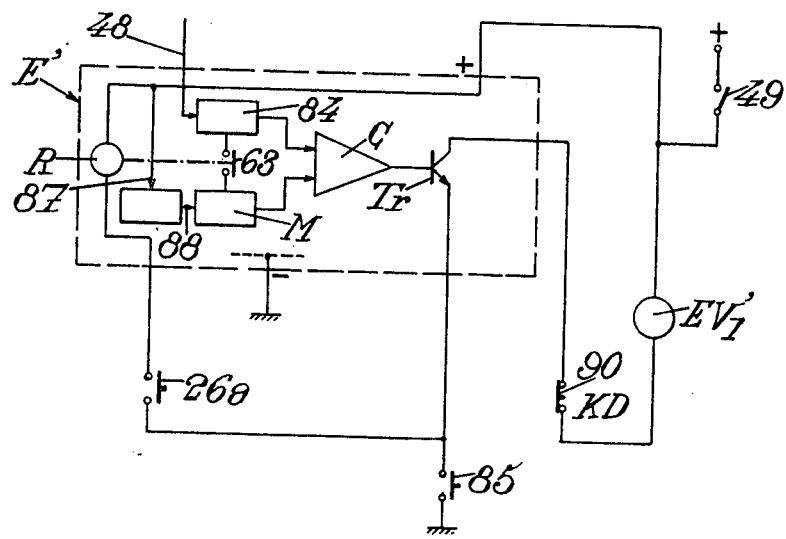
FIG. 26 is an electronic block diagram used with the assembly of FIG. 25.

The electronic control E' used in combination with the modification of FIG. 25 is shown in FIG. 26.

The diagram of this FIG. shows important simplifications with respect to FIG. 19.

Similar elements or elements playing equivalent roles to those of the elements of FIG. 19 which have already been described, are denoted by the same reference numerals and their description is not repeated.

As can be seen, from FIG. 26, the output from the comparator C is connected to the base of a single transistor Tr, for example an NPN transistor. The emitter of this transistor is connected to ground, through, if necessary, a contactor 85 of the gear box when the limiter operates with data on the engine speed.

The winding of the electrovalve EV'1 is connected between the positive supply, through the general switch 49, and a terminal of the "kick-down" contact 90 similar to that of FIG. 19. The other terminal of this contact 90 is connected to the collector of the transistor Tr. This contact 90 is normally closed; the opening of 90 is only obtained on "kick-down", when the pedal 4 overcomes the stop.

The signal supplied by the comparator C at its output is such that the transistor Tr is blocked when the speed or the engine speed is less than the reference speed contained in the storage M.

The transistor Tr is conducting when the speed or engine speed is greater than the above-said reference speed.

The operation of the limiter device formed by the assembly of FIGS. 25 and 26 is as follows.

When the limitation-regulation is not engaged, the electrovalve EV'1 is not energised and is hence closed, the chamber 15 of the jack 13 is at atmospheric pressure and this jack has its maximum length. By reason of this stiffness of the spring 18a, the control by the accelerator pedal 4 is effected normally.

When the limitation-regulation is engaged, suction is admitted into the jack 13.

The driver can depress fully the pedal 4 and drive with his "foot to the floor", since the variations of the length of the jack 13 actuated by the opening or the closing of the electrovalve EV'1 ensures regulation. The base 19a on regulation has thus a constant position since the sector 6 and the lever 98b remain in the position corresponding to the "foot to the floor" on the accelerator pedal.

It is seen from FIG. 26 that when the transistor Tr conducts, that is to say when the speed of the vehicle exceeds the reference speed, the electrovalve EV'1 is energised and suction is admitted into the jack 13. As a result there is a decrease in the opening of the throttle valve.

The opposite effect is produced when the transistor Tr is blocked.

If in the course of limitation-regulation, the conductor wishes to have available the maximum power of the engine and hence to overcome the limitation, it is sufficient for him to pass through the stop, by a "kick-down", which causes the opening of the contact 90.

The electrovalve EV'1 is no longer energized and remains closed so that the jack 13 will recover its maximum length and actuate the maximum opening of the gas throttle valve.

It is to be noted that this maximum opening will necessarily be reached since it is actuated, in fact, by the expansion of the spring 18a. This expansion will be complete when the atmospheric pressure, due to the opening 17a, is completely reestablished in the jack 13.

If the driver lifts his foot, partly or fully, and whatever the opening and the suction, the return spring 8a of the pedal and the return spring of the butterfly valve immediately ensure the closing of the butterfly valve and hence the deceleration of the vehicle.

The speed falling to a value less than the reference speed, the electrovalve EV'1 will be a rest and the jack 13 will be placed at atmospheric pressure, which ensures the return of the accelerator pedal to its normal position.

It will thus be seen that the embodiment of FIGS. 25 and 26 is very simple and economical whilst ensuring satisfactory operation.

The device of FIGS. 25 and 26 enables the automatic reengagement of the limiter device to be ensured after a "lifting of the foot". It can also provide a device for the initial preselection of the limiting speed.

It should be noted that the expression "foot to the floorboard" used in the description and the claims, is intended to denote, generally, the stroke end position corresponding to the maximum opening of the throttle valve, in manual operation whether this control is by the foot, as is generally the case, or by the hand. Referring to FIG. 27, it is seen that the linking means L provided between the pedal 4 and the member 3 comprise a flexible link formed by the cable 5 attached to one end 4a of the pedal 4. This pedal is pivoted between its two ends, at 4b. At its other end, the cable 5 is wound on the circular sector 6 and is connected to the return spring 8. The sector 6 can rotate around the axle 7. The rod 9, borne by the sector 6, is connected by a pivot to the end of a rod 10. The other end of this rod is pivoted on the arm 11 fixed in rotation to the axle of the member 3. This arm 11 controls the angular position of said member; a return spring 12 urges the arm 11 into the position corresponding to the closing of the member 3.

The limiter device comprises driver means sensitive to the suction in the intake manifold 2. These driving means are constituted by the pneumatic jack 13 with a deformable bellows 14 defining an inner chamber 15 connected through a passage 16 to the manifold 2 downstream of the throttle member 3. The opening or closing of the passage 16 is controlled by the electrovalve EV1. The base 19 of the jack 13 is fixed whilst the bottom 14a of the bellows 14 can be moved. A return spring 18, working in compression is arranged between the bottom 14a and the base 19.

A passage 17, shown diagramatically in the drawings, is provided in the electrovalve EV1 to ensure, permanently, a slow leak to the atmosphere of the chamber 15, whether the electrovalve EV1 is open or closed.

A duct 17a is provided to ensure a rapid leak to the atmosphere of the chamber 15. The opening of this duct 17a is controlled by the electrovalve EV3 whose winding is connected to the positive terminal "+" by the electrical contact of the device 27 (kick-down device). The other terminal of the winding of the electrovalve EV3 is directly connected to ground. This electrovalve EV3 is arranged so as to close the duct 17a when it is energised and to open this duct 17a and hence the rapid communication to the atmosphere when it is not energised.

The linking means L have a substantially constant length when the limiter device is not engaged, that is to say when the electrovalve EV1 is closed, and a variable length when the limiter is engaged, that is to say when the electrovalve is open. It is recalled that when the limiter device is engaged, the driver keeps the pedal 4 supported against the device 27 without however pushing down the spring 28, so that the electrical contact shown in the drawings remains closed.

For this, the linking means L comprise guide means G for the flexible link 5 adapted to determine a path $t$ in broken line for this link 5, as is clearly seen in FIGS. 1 and 2; one at least of the guide means is adapted to be moved by the pneumatic jack 13 sensitive to the suction in the manifold 2, so that the length of the path in broken line is variable.

It should be noted that the flexible link 5, constituted generally by a metal cable is inextensible and has a constant length.

However, the effective length of the part of the linking means L which come into play to determine the degree of opening of the throttle valve 3 is that of the rectilinear segment joining the end 4a of the accelerator pedal 4 to the point 6a of the sector 6, corresponding to the beginning of the winding of the cable 5 on the sector.

It is hence possible to say that the (effective) length of the linking means L depends essentially on the length of a flexible link equivalent to the cable 5 but which would be tight between the points 4a and 6a. It appears immediately that the effective length of this equivalent would depend on the shape and the inclination of the segments of the broken line of the part t of the cable 5.

Advantageously, the guide means G determine a path in the form of an obtuse angle whose sides $t_1$ and $t_2$ are formed by the segments of the cable 5.

The guide means are constituted by three return pulleys $p_1$, $p_2$, $p_3$ separated from one another in the general direction of the line passing through the points 4a and 6a.

The two end pulleys are mounted rotatively on fixed axles $a_1$ and $a_3$, whilst the intermediate pulley $p_2$ forming the apex of the angle is mounted rotatively on an axle $a_2$ adapted to be moved by the pneumatic jack 13.

The cable 5 winds round these pulleys and the pulleys $p_1$ and $p_3$ are located, with respect to the cable on the opposite side to that of the pulley $p_2$.

The segments of the cable 5 comprised between the point 4a and the pulley $p_1$ and between the pulley $p_3$ and the point 6a are substantially aligned; the pulley $p_2$ is preferably equidistant from the pulleys $p_1$ and $p_3$.

The direction of movement of the axle $a_2$ of the pulley $p_2$ is preferably substantially merged with the direction $\Delta$, shown by a double arrow, perpendicular to the line passing through the axles $a_1$, $a_3$ of pulleys $p_1$ and $p_3$.

The axle $a_2$ as well as the pulley $p_2$ are mounted at the end of a lever $f$ whose other end is pivoted on a fixed point $a_4$.

The bottom 14a of the bellows of the jack 13 is connected by a rigid rod 20a to the middle part of the lever $f$; the linkage between the rod 20a and the lever $f$ is ensured by a pivot $a_5$. The rod 20a is guided in translation by a sleeve 20b.

The dimensions of the lever $f$ and the positions of the pivots $a_5$ and $a_4$ are selected so that when the jack 13 is fully compressed (maximum suction admitted into the bellows 14) the pulley $p_2$ occupies the position corresponding to a straight path of the cable 5 between the pulleys $p_1$ and $p_3$; in addition, the circular arc described by the axle $a_2$, between its limiting positions corresponding to the maximum length of the jack 13 and its minimum length, it subtended by a chord whose inclination to the direction $\Delta$ is small.

In the solution adopted in FIG. 27, the pivoting axle $a_5$, situated at mid-distance of the lever $f$ is substantially, when the jack 13 has its maximum length as shown in the drawing, on the line passing through the points 4a and 6a; the acute angle formed between the lever $f$ and the line passing through 4a and 6a, for the maximum length of the jack 13 is of the order of 30°.

A stop $b_1$ is provided to arrest the lever $f$ in the angular position corresponding to the total closing of the butterfly valve 3 when the pedal 4 is completely released.

The operation of the device of FIG. 27 is as follows.

When the limiter device is not engaged, the electrovalve EV1 is closed in the same way as the electrovalve EV3. The jack 13 is placed to the atmosphere by the slow leak 17.

This jack 13 has then its maximum length, under the effect of the return spring 18 so that the pulley $p_2$ is spaced to the maximum (upwards in FIG. 1) from the line joining the axes $a_1$ and $a_3$. When the pedal 4 is completely released, the member 3 is closed. When the pedal 4 is fully pressed, the member is completely open. The control, from this pedal 4, is hence effected normally.

When the limiter device is engaged, the electrovalve EV1 is open and the suction of the manifold 2 is admitted into the chamber 15 of the jack; in fact, the slow leak 17 is sufficiently small not to resist the establishment of this suction.

In this limitation phase, the driver maintains the pedal 4 supported against the device 27 forming the resistant point, without however overcoming this resistant point, so that the electrical contact remains closed.

This position of the pedal 4 would correspond normally to complete opening of the throttle member 3.

However, due to the fact that the suction is admitted into the jack 13, the latter is compressed more or less according to this suction, which results in the movement of the axle $a_2$ and of the pulley $p_2$.

If the suction has a tendency to increase, which correponds to an increase in the speed of rotation of the engine, the jack 13 has a tendency to be further compressed so that the pulley $p_2$ will drop. The point 4a remaining fixed, the available effective length of the cable 5 will increase so that the point 6a will be able to move away from the point 4a under the effect of the tractive force exerted by the spring 8. The sector 6 will rotate in anti-clockwise direction, which will result in closing of the throttle member 3 and a decrease in the rotary speed of the engine.

In the reverse case, if the suction is too small, which corresponds to a rotary speed of the engine which is too low, the jack 13 extends under the effect of the spring 18 and the pulley $p_2$ separates from the line passing through the axes $a_1$ and $a_3$. The available effective length of the cable 5 between the point 4a and the point 6a will decrease. The point 4a remaining fixed, the point 6a will approach the point 4a and result in the rotation of the sector 6 in clockwise direction. There is as a result opening of the throttle member 3, accompanied by increase in the rotary speed of the engine.

The limiter device will hence maintain, when it is engaged, the speed parameter (speed of the engine or speed of the vehicle) at a constant value equal to the reference.

When the limiter is engaged, the pedal 4 being depressed to the resistant point 27, the jack 13 permits, when it is totally compressed, the complete opening of the throttle member 3 to be actuated, although the position of the pedal 4 corresponds, for normal operation without limitation, to complete opening of said member 3.

As previously explained, when the limiter is engaged, the driver does not have to move the pedal 4, the jack 13 ensuring the speed regulation.

The depression of the device 27 by the driver actuates the opening of the electrovalve EV3 and the rapid communication to the atmosphere of the jack 13 through the duct 17a. The jack then takes up its maximum length and, due to the fact of the position of the pedal 4, complete opening of the member 3 is obtained.

Whatever the position of the lever $f$, deceleration (closing of the member 3) is obtained by lifting the foot from the pedal 4. In fact, the cable 5 is then relaxed and the springs 8 and 12 ensure the return of the member 3 to the closed position.

In the embodiment of FIG. 28 a force amplifier 120 advantageously constituted by a hydraulic amplifier, is provided between the pneumatic jack 13 and the element to be actuated.

This amplifier comprises a housing 121 including a cylindrical ball 122 in which a slide valve 123 can slide for the distribution of the liquid under pressure. The bore 122 comprises two orifices 124, 125 in its lateral wall, connected respectively to a source of liquid under high pressure (HP) and to a tank of liquid at atmospheric pressure (R). A spring 126 is provided between each end of the slide valve 123 and the neighbouring end of the bore. The slide valve 123 is provided with a central cylindrical shoulder 127 separating two annular grooves 128, 129. In resting position, the two springs 126 hold the slide valve 123 in a position for which the shoulder 127 closes a passage 130 and prevents any communication between, on the one hand, this passage and the orifices 124 and 125.

The passage 130 opens into the chamber 131 of a hydraulic jack whose cylinder 132 is formed in the housing 121. The piston 133 of this jack slides in fluid-tight manner in the cylinder 132.

The piston 133 is subjected on the one hand, to the effect of the liquid under pressure admitted in chamber 131 and on the other hand, to the effect of a return spring 134 situated on the opposite side.

The piston 133 is connected by a rigid rod 135 to the pivoting point $a_5$ of the lever $f$. When the chamber 131 is placed to exhaust, the spring 134 pushes the piston 133 so that the rod 135 emerges to the maximum from the housing 120.

The movements of the slide valve 123 are actuated by the pneumatic jack 13. The rod 20a connected to the bottom 14a of this jack acts on the slide valve 123 through a lever 136 connected respectively at its two ends to the rod 20a and to the slide valve 123 through a rod 137. The lever 136 is pivoted on a pivot 138 situated between its two ends. Preferably, this pivot 138 is closer to the rod 137 than the rod 20a, so that the force produced by the jack 13 and transmitted to the slide valve 123 is amplified by this lever 136.

An orifice 139 is provided in the bottom of the cylinder 132 to ensure the return of the liquid leakages; in the same way sufficient lateral plays $j$ are provided at the passage of the rods 135 and 137 through the wall of the housing 120 to ensure a leakage return.

The other elements of the limiter device of FIG. 28 are similar to those of FIG. 27 and are denoted by the same reference numerals.

The operation of the device of FIG. 28 is similar to that of FIG. 27.

The piston 133 which actuates the movements of the lever $f$ is slaved to the pneumatic jack 13.

When the limiter device is not engaged, the pneumatic jack 13 is connected to the atmosphere, the slide valve occupies the position for which the passage 130 is connected to the orifice 125 and to the tnk R and the pressure in the chamber 131 of the hydraulic jack is nil. The piston 133 is pushed back by the spring 134 and the lever L is supported against the stop $b_1$. The actuation of the throttle member 3 is effected normally by the pedal 4.

When the limiter is engaged, the electrovalve EV 1 is open and the suction is admitted into the pneumatic jack 13 which is more or less compressed, according to the suction.

The slide valve 123 is moved by the jack 13.

An increase in the suction in the manifold 2, which corresponds to an increase in the rotary speed of the engine, results in stronger compression of the jack 13 and rotation of the lever 136 around the pivot 138 in anticlockwise direction. The slide valve 123 is therefore moved upwards in FIG. 2, which causes the admission of liquid under pressure into the chamber 131.

The piston 133 drops and with it the lever $f$. The member 3 has hence a tendency to close; the limiter will thus keep the spaced parameter at constant value. It is recalled that when the limiter is engaged, the pedal 4 is supported against the device 27, the point 4a remaining fixed.

With such a position the pedal 4, when the limiter is engaged, it is however possible to obtain the complete closing of the member 3 when the lever $f$ is pulled downwards to the maximum by the piston 133. This corresponds to the complete compression of the spring 18 of the pneumatic jack 13.

The intervention of the kick-down contact of the device 27 and the deceleration are obtained under the same conditions as with the device of FIG. 1.

By means of the force amplifier 120, it is possible to use a pneumatic jack 13 of small size, having an inner spring 18 capable of starting to be compressed for a very low suction, which eliminates the drawbacks associated with automatic operation of a jack of large volume.

The force amplifier 120 enables easy operation with the forces connected to the control of the gas butterfly valve 3 and to the movable lever $f$.

I claim:

1. Speed limiter device for an automobile vehicle having a combustion engine comprising an air intake manifold provided with a throttle member, manual control means of the accelerator pedal type to act on the opening of the throttle member and connecting means between these opening control means and the throttle member, this limiter device comprising an assembly of:

means sensitive to a speed parameter of the vehicle, which sensitive means are adapted to produce a speed signal, comparator means provided to compare this signal with a predetermined limit, and amplifier means for the signal supplied by the comparator means, these amplifiers means being adapted to control the actuation of drive means sensitive to the suction in the intake manifold, these drive means acting on the opening of the throttle member so as to keep the value of the speed parameter of the vehicle at the predetermined limit when the limiter device is engaged, said connecting means between the opening control means and the throttle member being arranged so as to have a substantially constant length when the limiter device is not engaged and to have a variable length when the limiter device is engaged, said limiter device comprising a device forming a resistant point for the stroke end of the manual control means, said resistant point device being adapted to be overcome by the manual control means on exerting a sufficient force on the control means, electrical contact means being also provided to be actuated by the manual control means when said resistant point is overcome, said electrical contact means being adapted to actuate the maximum opening of the throttle member, the assembly being such that when the limiter device is engaged, the driver of the vehicle maintains the manual control at the stroke end in abutment against the resistant point device and, in the course of limitation, the overcoming of this resistant point enables the limitation to be overcome and the maximum opening of the throttle member and thus the maximum engine power, to be obtained.

2. Speed limiter device according to claim 1, wherein the connecting means comprise a telescopic rod formed by a cylinder and a piston adapted to slide in the cylinder, said piston being restrainable in axial position, with respect to the cylinder, by a bolt adapted to be withdrawn by unlocking means; electrical contact means, adapted to change state according as the piston and the cylinder are locked or unlocked, being provided, one at least of said electrical contact means being connected so as to actuate the disengagement of the limiter device at the moment of locking the cylinder and piston, which occurs when the manual control is released (lifting of the foot) when the limiter was engaged.

3. Limiter device according to claim 2, wherein the bolt of the telescopic rod is constituted by the core, or a part fast to the core, of an electromagnet mounted on the cylinder of the rod, said electromagnet constituting the unlocking means of the telescopic rod.

4. Limiter device according to claim 2, wherein the electrical contact means comprise a stroke end contact normally open when the telescopic rod is locked, said normally open contact being closed when the telescopic rod is unlocked, the electrical connection of this normally open contact being such that engagement of the limiter device cannot take place as long as this normally open contact is not closed.

5. Limiter device according to claim 2, wherein the electrical contact means adapted to change state according as the telescopic rod is locked or unlocked, are constituted by a microswitch mounted on the cylinder, said microswitch comprising an arm adapted to cooperate with a groove provided in the piston, the position of this groove being such that the arm changes position and that the microswitch changes state according as the telescopic rod is or is not locked.

6. Limiter device according to claim 5, wherein the microswitch comprises a contact (working or resting) adapted to actuate the disengagement of the limiter device when the locking of the telescopic rod occurs when the limiter is engaged.

7. Limiter device according to claim 2, wherein the throttle member drive means, sensitive to the suction in its intake manifold, are constituted by a pneumatic jack having a chamber connected to the intake manifold of the engine, downstream of the throttle member, the admission of suction into this chamber being controlled by control means, wherein the jack includes a fixed base and a bottom movable according to the suction, said movable bottom being connected by flexible means to a lever actuating the opening of the throttle member, the admission of suction into the jack causing contraction of the latter and opening of the throttle member, said jack comprising also a passage enabling a slow leak to be established between the chamber of the jack and the atmosphere, this passage being equipped with a second electrovalve adapted to control the opening or closing of said slow leak, said electrical contact means actuated by the manual control means on passage through the resistant point as the stroke end, being adapted to control the admission of suction into the chamber of the jack through the first electrovalve and the closing of the slow leak by the second electrovalve, which results in the full opening of the throttle member.

8. Limiter device according to claim 7, wherein the electrical contact means actuated on the overcoming of the resistant point by the manual control means at the end of the stroke, comprise two electrical contacts adapted to be closed successively, the first electrical contact, closed by the manual control means ensuring the bringing into action of the unlocking means of the telescopic rod, notably the energising of the energising of the electromagnet, whilst the second electrical contact closed after the first, controls the closing of the slow leak to the atmosphere of the pneumatic jack.

9. Limiter device according to claim 7, comprising means sensitive to the torque demanded by the engine of the vehicle and means for comparing this torque with a predetermined value, the assembly being such that when the torque demanded reaches or exceeds the predetermined value, the closing of the slow leak to the atmosphere of the pneumatic jack is actuated.

10. Limiter device according to claim 9, wherein the means sensitive to the torque demanded at the engine are constituted by the duration of the actuating signal for the opening of the electrovalve admitting suction into the chamber of the jack, the predetermined value of the torque of the engine being constituted by a predetermined duration of the actuating signal for the opening of the electro valve, this predetermined duration being obtained by a monostable circuit.

11. Limiter device according to claim 2, comprising electrical contact means sensitive to the direction of the force transmitted by the telescopic rod between the manual control means (accelerator pedal) and the throttle member, an acceleration or a deceleration of the engine being obtained according to the direction of said force.

12. Limiter device according to claim 7, comprising electrical contact means sensitive to the direction of the force transmitted by the telescopic rod between the manual control means (accelerator pedal) and the throttle member, an acceleration or a deceleration of the engine being obtained according to the direction of said force and wherein the electrical contact means sensitive to the direction of the force transmitted by the telescopic rod, are connected so as to control the admission of the suction into the pneumatic jack when the direction of the force corresponds to an acceleration actuated by the manual control means, the admission of the suction into the jack being cut off when the direction of the force is opposite and corresponds notably to the actuation of deceleration by the manual control, the slow leak of the jack to the atmosphere being then opened, the assembly being such that when the limiter device is not engaged, the jack occupies the position corresponding to the opening of the throttle member so that the flxible means from the bottom of the jack to the lever of the throttle member remains tight.

13. Limiter device according to claim 3, comprising electrical contact means sensitive to the direction of the force transmitted by the telescopic rod between the manual control means (accelerator pedal) and the throttle member, an acceleration or a deceleration of the engine being obtained according to the direction of said force, and wherein the bolt of the telescopic rod is adapted to cooperate with a groove provided in the piston, whose axial dimension is distinctly greater than that of the bolt and wherein the electrical contact means are constituted by a microswitch borne by the cylinder of the telescopic rod and cooperating with the piston, the axial dimensions of the groove of the piston and the arrangement of the microswitch being such that said microswitch changes in state according as the bolt, when the telescopic rod is locked, cooperates with one leading edge or with the other leading edge of the groove of the piston.

14. Limiter device according to claim 12, wherein the piston of the telescopic rod is extended by a portion of smaller diameter which passes through the bottom of the cylinder and projects, through one end, outside of the cylinder, said end being provided with a stop for the cylinder, said electrical contact means sensitive to the direction of the force transmitted by the telescopic rod being constituted by conducting plates, suitably insulated, arranged between the stop and the bottom of the cylinder, said plates being adapted to establish an electrical contact when the driving of the cylinder is ensured by the stop of the piston, the bolt of the telescopic rod being adapted to cooperate with the shoulder formed at the junction of the portion of smallest diameter of the piston with the rest of the piston.

15. Limiter device according to claim 12, wherein the pneumatic jack is equipped with a fast leak for placing its chamber in communication with the atmosphere, said fast leak being controlled by a third electrovalve actuated by said means sensitive to the direction of the force transmitted by the telescopic rod, said third electrovalve being notably connected so as to be closed when it is energised.

16. Limiter device according to claim 1, wherein the drive means sensitive to the suction in the intake manifold are formed by a pneumatic jack, wherein said pneumatic jack is inserted in the connecting means between the control means and the throttle member, the whole of this pneumatic jack being movable, said pneumatic jack comprising return means, notably formed by a spring, whose stiffness is such that the jack can transmit to the throttle member, up to fully open position, the force exerted by the manual control means, whilst preserving a length equal to its maximum length and this when the limiter device is not engaged and suction is not admitted into the jack, said jack including a permanent slow leak for communicating its inner chamber to the atmosphere, the assembly being such that when the limiter device is engaged, for the "foot to the floor board" position of the manual control, the throttle member is at maximum opening and the jack is connected to the atmosphere, whilst said throttle member is fully closed when suction is admitted into the jack, so that the driver can drive "with his foot to the floor board" when the limitation is engaged.

17. Limiter device according to claim 16, wherein the jack includes a base connected to a lever fast in rotation to a sector adapted to be moved by the manual control means, whilst the bottom of the jack is connected to another lever which, through a telescopic rod, acts on the position of the throttle member.

18. Limiter device according to claim 16, wherein a single electrovalve is provided for the control of the opening or closing of a passage connecting the chamber of the jack to a suction zone of the intake manifold.

19. Limiter device according to claim 18, wherein the electrical contact means provided to be actuated by the manual control means when the resistant point is passed through are constituted by an electrical contact normally closed and adapted to be opened when said resistant point is passed through, the opening of this electrical contact actuating the energising of the electrovalve controlling the admission of suction into the chamber of the jack, and the closing of said electrovalve, so that the jack is connected to the atmosphere, which causes the complete opening of the throttle member.

20. Limiter device according to claim 1, wherein said connecting means comprise a flexible tie and guide means for the tie adapted to define a path in broken line for said flexible tie, one at least of the guide means being adapted to be moved by the drive means sensitive to the suction so that the length of the path in broken line is variable when the limiter device is engaged, said length of the path in broken line remaining constant when the device is not engaged.

21. Limiter device according to claim 20, wherein the guide means define a path in the form of an obtuse angle whose two sides are formed by segments of the tie, the guide means adapted to be moved by the drive means being situated at the apex of this angle.

22. Limiter device according to claim 20, wherein the guide means are constituted by three return pulleys separated from one another, the two end pulleys being mounted on fixed axles whilst the intermediate pulley is mounted on an axle adapted to be moved by the drive means.

23. Limiter device according to claim 22, wherein the movable axle of the pulley situated at the top of the obtuse angle is mounted at the end of a lever pivoted on a fixed point, the angular position of this lever being controlled by the suction sensitive drive means.

24. Device according to claim 23, wherein the drive means are connected by a rod to a pivot provided at one point of the lever, notably between the movable pulley and the fixed pivoting point.

25. Device according to claim 20, wherein the drive means comprise a pneumatic jack, and wherein the base of this jack is fixed, whilst the bottom is movable, this bottom being notably connected directly or indirectly to the guide means of the flexible tie adapted to be moved by the suction sensitive drive means.

26. Limiter device according to claim 23, wherein the drive means are connected by a rod to a pivot provided at one point of the lever, notably between the movable pulley and the fixed pivoting point and wherein the drive means comprise a pneumatic jack, and wherein the base of this jack is fixed, whilst the bottom is movable, this bottom being notably connected directly or indirectly to the guide means of the flexible tie adapted to be moved by the suction sensitive drive means and wherein the bottom of the pneumatic jack is directly connected through a rod to the pivot provided at a point of the lever bearing the movable pulley.

27. Limiter device according to claim 1, in which the suction sensitive drive means comprise a pneumatic jack, wherein a force amplifier is provided between the pneumatic jack and the element which must be actuated by the jack, so that the pneumatic jack acts on the input of this amplifier whilst said element is controlled by this amplifier.

28. Device according to claim 24, wherein the drive means comprise a pneumatic jack, and wherein the base of this jack is fixed, whilst the bottom is movable, this bottom being notably connected directly or indirectly to the guide means of the flexible tie adapted to be moved by the suction sensitive drive means and in which the suction sensitive drive means comprise a pneumatic jack, wherein a force amplifier is provided between the pneumatic jack and the element which must be actuated by the jack, so that the pneumatic jack acts on the input of this amplifier whilst said element is controlled by this amplifier and wherein the force amplifier is hydraulic and comprises a slide valve actuated by the pneumatic jack, and a hydraulic jack comprising a piston subject to action of a liquid under pressure whose admission is controlled by the slide valve, said piston being connected to the pivot provided on the lever carrying the movable pulley.

29. Limiter device according to claim 25 wherein the pneumatic jack includes a fast leak duct controlled by an electrovalve, itself controlled by electrical contact means capable of being actuated by the manual control means passing through the resistant point, the assembly being arranged so that the fast leak is open when the resistant point is overcome, said opening of the fast leak causing connection of the jack to the atmosphere and the maximum opening of the throttle member.

30. Limiter device according to claim 1, comprising means sensitive to the swinging of a signal applied by comparator means when the speed parameter of the vehicle reaches and exceeds the predetermined limit, said signal-swing sensitive means being adapted to actuate the automatic engagement of the speed limiter.

31. Limiter device according to claim 30, wherein the signal-swing sensitive means are constituted by a gate whose opening is actuated by said swinging signal, the opening of said gate resulting in the engagement of the limiter device.

32. Limiter device according to claim 31, wherein the means sensitive to the swinging signal are constituted by a transistor whose base is connected to the output of the comparator means, the transistor being mounted so as to pass from the blocked state to the conductive state when the signal swings, the conduction of the transistor being accompanied by the engagement of the limiter device.

33. Limiter device according to claim 30 for an automobile vehicle having an automatic gear box, wherein the speed parameter of the vehicle is the actual speed of the vehicle.

34. Limiter device according to claim 30 for an automobile vehicle having a mechanical gear box, comprising a gear box contactor adapted to permit the engagement of the limiter device only for a predetermined gear ratio, notably the highest ratio, so that it is then posible to use the engine speed as the speed parameter.

35. Limiter device according to claim 30 comprising a gear protection device enabling the setting on one input of the comparator means, of a value of the predetermined limit to which the speed signal will be compared.

36. Limiter device according to claim 35, wherein the speed preselection device comprises a continuously adjustable knob, notably constituted by the cursor of a potentiometer.

37. Limiter device according to claim 7 wherein said suction admission control means is an electrovalve.

38. Limiter device according to claim 7, wherein said flexible means is a chain.

* * * * *